(12) United States Patent
Ye et al.

(10) Patent No.: US 12,510,802 B2
(45) Date of Patent: Dec. 30, 2025

(54) RETRACTABLE CAMERA MODULE AND ELECTRONIC DEVICE

(71) Applicant: NINGBO SUNNY OPOTECH CO., LTD., Ningbo (CN)

(72) Inventors: Linmin Ye, Ningbo (CN); Tianyuan Guan, Ningbo (CN); Yanning He, Ningbo (CN); Zhewen Mei, Ningbo (CN)

(73) Assignee: NINGBO SUNNY OPOTECH CO., LTD., Ningbo (CN)

( * ) Notice: Subject to any disclaimer, the term of this patent is extended or adjusted under 35 U.S.C. 154(b) by 388 days.

(21) Appl. No.: 18/272,352

(22) PCT Filed: Dec. 17, 2021

(86) PCT No.: PCT/CN2021/139087
§ 371 (c)(1),
(2) Date: Jul. 14, 2023

(87) PCT Pub. No.: WO2022/151914
PCT Pub. Date: Jul. 21, 2022

(65) Prior Publication Data
US 2024/0094602 A1    Mar. 21, 2024

(30) Foreign Application Priority Data

Jan. 15, 2021 (CN) .......................... 202110055137.7

(51) Int. Cl.
G03B 5/02 (2021.01)
H04N 23/55 (2023.01)

(52) U.S. Cl.
CPC ............... *G03B 5/02* (2013.01); *H04N 23/55* (2023.01); *G03B 2205/0046* (2013.01)

(58) Field of Classification Search
CPC ............................. G03B 17/04; H04N 23/55
See application file for complete search history.

(56) References Cited

U.S. PATENT DOCUMENTS

| 8,687,298 B2 * | 4/2014 | Koyama | ............... | G03B 17/14 |
| | | | | 359/826 |
| 2004/0228626 A1 | 11/2004 | Endo et al. | | |
| 2006/0018654 A1 | 1/2006 | Nuno et al. | | |

FOREIGN PATENT DOCUMENTS

| CN | 1648708 A | 8/2005 |
| CN | 1743941 A | 3/2006 |
| CN | 101027604 A | 8/2007 |
| CN | 111083259 A | 4/2020 |
| JP | 2014052578 A | 3/2014 |
| WO | 2020192439 A1 | 10/2020 |

\* cited by examiner

*Primary Examiner* — Leon W Rhodes, Jr.
(74) *Attorney, Agent, or Firm* — Che-Yang Chen

(57) ABSTRACT

Disclosed are a retractable camera module and an electronic device, wherein a lens of the retractable camera module is retractable relative to a photosensitive chip thereof, so as to be switched between a working state and a non-working state, wherein in the working state, the lens of the retractable camera module is stretched out for imaging, in the non-working state, the lens of the retractable camera module is retracted back to reduce the overall height of the retractable camera module, in this way, the technical contradiction between the overall height dimension and a large effective focal length of the traditional upright camera module is solved.

20 Claims, 19 Drawing Sheets

RETRACTABLE CAMERA MODULE AND ELECTRONIC DEVICE

CROSS REFERENCE OF RELATED APPLICATION

This is a U.S. National Stage under 35 U.S.C. 371 of the International Application Number PCT/CN2021/139087, filed on Dec. 17, 2021, which claims priority to Chinese Patent Applications No. 202110055137.7, filed on Jan. 15, 2021, the contents of which are incorporated herein by reference in their entireties.

FIELD OF INVENTION

The present invention relates to the field of camera module, and in particular, to a miniaturized and retractable camera module and electronic device for terminal equipment.

DESCRIPTION OF RELATED ARTS

With the popularity of mobile electronic devices, the technology related to camera modules that are used in mobile electronic devices to help users obtain images (e.g., video or images) has been rapidly developed and advanced. Currently in the market, the camera modules configured for mobile electronic devices (e.g., smartphones) need to implement a superzoom shooting function.

In order to achieve superzoom shooting, at least one telephoto camera module needs to be configured (here, the telephoto camera module refers to a camera module with a larger effective focal length). Moreover, with the increase of the zoom factor, the total focal length of the telephoto camera module will increase accordingly, which leads to the continuous increase of the overall height and size of the camera module, it is difficult to adapt to the development trend of thin and light electronic device.

In order to solve the technical contradiction between the height design and the high zoom shooting function of the camera module, most manufacturers use periscopic camera modules to replace the traditional upright camera modules. Compared with the traditional upright camera module, the periscope camera module with light turning elements (e.g., prisms, mirrors, etc.) to change the imaging optical path, so as to achieve a reduction in the overall height of the camera module while meeting the optical design needs of obtaining a larger effective focal length.

However, the periscope camera module has a relatively more complex structure, which on the one hand leads to its cost, on the other hand, also directly leads to the increase in the difficulty of its process. In terms of optical performance, although the periscope camera module has a relatively large effective focal length, but its effective focal length is a fixed value, that is, the optical performance of the periscope camera module has a relatively poor adjustability. In order to meet the diverse needs of consumers for camera modules, usually need to configure multiple camera modules for electronic devices, that is, multiple camera modules are configured for electronic devices, which not only brings a surge in cost, but also further exacerbates the difficulty of its process.

Therefore, a new camera module is needed.

SUMMARY OF THE PRESENT INVENTION

An advantage of the present invention is to provide a retractable camera module and an electronic device, wherein the lens of the retractable camera module is retractable with respect to its photosensitive chip to be switched between an operating state and a non-operating state, wherein, in the operating state, the lens of the retractable camera module is stretched out for imaging, and in the non-operating state, the lens of the retractable camera module is retracted to reduce the overall height dimension of the retractable camera module, in such a way that the technical contradiction between the height design and the larger effective focal length of the conventional upright camera module is resolved.

Another advantage of the present invention is to provide a retractable camera module and an electronic device, wherein the distance between the lens and the photosensitive chip of the retractable camera module can be adjusted by a retractable assembly, so as to make the optical performance of the retractable camera module have better adjustability and adapt to different imaging requirements.

Still other advantages and features of the present invention will become apparent from the description below and may be realized by the means and combinations specifically pointed out in the claims.

In order to achieve at least one of the above advantages, the present invention provides a retractable camera module comprising:

a photosensitive assembly comprising a base plate, a circuit board supported on the base plate and a photosensitive chip electrically connected to the circuit board;

a lens held on a photosensitive path of the photosensitive assembly; and a retractable assembly configured to adjust a relative positional relationship between the lens and the photosensitive chip, wherein the telescopic assembly comprise:

a retractable sleeve assembly provided on the base plate, wherein the lens is held within the retractable sleeve assembly; and a first driving element, wherein the first driving element is configured to drive the retractable sleeve assembly to perform a telescopic motion relative to the photosensitive chip along the photosensitive path;

wherein the lens is capable of moving telescopically relative to the photosensitive chip by the first driving element and the retractable sleeve assembly to be switched between a working state and a non-working state, wherein when in the working state, the retractable sleeve assembly is driven to be stretched upwardly relative to the photosensitive chip to drive the lens to move upwardly relative to the photosensitive chip, so as to increase the distance between the lens and the photosensitive chip; when in a non-working state, the retractable sleeve assembly is driven to retract downwardly relative to the photosensitive chip to drive the lens to move downwardly relative to the photosensitive chip, so as to reduce the optical the distance between the lens and the photosensitive chip.

wherein the retractable sleeve assembly comprises:

a fixing portion arranged on the bottom plate;

a plurality of movable members embedded in the fixing portion and nested with each other; and at least one supporting frame is arranged between every two adjacent movable members, so that two corresponding movable members are capable of being structurally strengthened by the supporting frame.

In the retractable camera module according to the embodiment of the present invention, the retractable sleeve assembly has a lower end and an upper end opposite to the lower end, and the lens is mounted on the upper end of the retractable sleeve assembly.

In the retractable camera module according to the embodiment of the present invention, the fixing portion of the retractable sleeve assembly defines the lower end, and the movable member located at the innermost layer among the plurality of movable members defines the upper end of the retractable sleeve assembly.

In the retractable camera module according to the embodiment of the present invention, the height dimension of the fixing portion ranges from 6 mm to 9 mm.

In the retractable camera module according to the embodiment of the present invention, the fixing portion comprises a casing provided on the bottom plate and a first sleeve embedded in the casing, wherein the first sleeve has a helix guiding rail defined and recessed in an inner surface thereof, and a first guiding groove recessed in the inner surface and extended vertically.

In the retractable camera module according to the embodiment of the present invention, the plurality of movable members comprise a first movable member embedded in the fixing portion, wherein the first driving element is configured to act on the first movable member to make the first movable member helically move upwardly or downwardly along the first helical guiding rail.

In the retractable camera module according to the embodiment of the present invention, the first movable member comprises a second sleeve drivably connected to the first driving element, wherein the second sleeve has a first guiding head protrudingly formed on an outer surface thereof, wherein when the second sleeve is embedded in the first sleeve, the first guiding head is engaged in the first helical guiding rail, so that the second sleeve is capable of being driven by the first driving element to move upwardly or downwardly along the first helical guiding rail helically.

In the retractable camera module according to the embodiment of the present invention, the fixing portion further comprises a third sleeve embedded in the second sleeve, wherein the third sleeve has a second helix guiding rail defined and recessed in an inner surface of the third sleeve, and a second guiding groove recessed in the inner surface and extended vertically.

In the retractable camera module according to the embodiment of the present invention, the at least one supporting frame comprises a first supporting frame embedded in the third sleeve, wherein the first supporting frame has a second guiding head formed at the lower end thereof, wherein when the first support frame is embedded in the first sleeve, the first guiding head is engaged in the first guide groove of the first sleeve, so that when the first support frame moves upwardly or downwardly following the first movable member, the first support frame vertically can move upwardly or downwardly along the first guide groove.

In the retractable camera module according to the embodiment of the present invention, the first supporting frame has a third guiding groove formed through a side surface thereof and extended vertically, and a moving space formed through the side surface thereof.

In the retractable camera module according to the embodiment of the present invention, the plurality of movable members further comprise a second movable member, wherein the second movable member comprises a fourth sleeve, wherein the fourth sleeve has a third guiding head protrudingly formed on an outer surface thereof, wherein the fourth sleeve is embedded in the first supporting frame and the third guiding head passes through the third guiding groove and is engaged in the second helical guiding rail of the third sleeve, wherein when the third sleeve is driven to move helically up or down, the fourth sleeve is driven to move vertically up or down along the second helical guiding rail under the action of the third guiding groove.

In the retractable camera module according to the embodiment of the present invention, the second movable member further comprises a fifth sleeve, and the fifth sleeve has a fourth guiding head protrudingly formed on an outer surface thereof and a third helical guiding rail defined and recessed in an inner surface of the fifth sleeve, wherein the fifth sleeve is embedded in the fourth sleeve and the fourth guide head is movably supported in the moving space of the first supporting frame, wherein when the first supporting frame is driven to move vertically up or down, the fifth sleeve is driven by the first supporting frame to move helically up or down.

In the retractable camera module according to the embodiment of the present invention, the at least one supporting frame comprises a second supporting frame embedded in the fifth sleeve, wherein the second supporting frame has a fifth guiding head protrudingly formed on an outer surface thereof, wherein when the second supporting frame is embedded in the fifth sleeve, the fourth guiding head is movably provided in the third guiding groove of the first supporting frame, wherein when the fifth sleeve is driven by the first support frame to move helically up or down, the second support frame is driven by the fifth sleeve to move vertically up or down under the action of the third guiding groove.

In the retractable camera module according to the embodiment of the present invention, the second supporting frame has a guiding portion protrudingly formed on an outer surface thereof and extended vertically.

In the retractable camera module according to the embodiment of the present invention, the third movable member comprises a sixth sleeve embedded between the second supporting frame and the fifth sleeve, the sixth sleeve has a sixth guide head protrudingly formed on an outer surface and a guiding slot concavely formed on in the inner surface of the sixth sleeve and extended vertically, wherein when the sixth sleeve is embedded between the second supporting frame and the fifth sleeve, the sixth guiding head is engaged in the third helix guiding rail of the fifth sleeve and the guiding portion is engaged in the guiding slot, wherein when the fifth sleeve is driven by the first supporting frame to move helically up or down, the sixth sleeve is driven to move vertically up or down along the third helical guiding rail under of the action of the guiding portion and the guiding slot.

In the retractable camera module according to the embodiment of the present invention, the casing is made of metal material, and the first sleeve is made of plastic material.

In the retractable camera module according to the embodiment of the present invention, the second sleeve of the first movable member is made of metal material, and the third sleeve of the first movable member is made of plastic material.

In the retractable camera module according to the embodiment of the present invention, the fourth sleeve of the second movable member is made of metal material, and the fifth sleeve of the second movable member is made of plastic material.

In the retractable camera module according to the embodiment of the present invention, the sixth sleeve is made of metal material.

In the retractable camera module according to the embodiment of the present invention, the second sleeve has an annular rack formed on the outer surface thereof, and a force provided by the first driving element is applied on the annular rack to drive the second sleeve to rotate.

In the retractable camera module according to the embodiment of the present invention, the first sleeve further has a receiving groove, and the retractable assembly further comprises a gear column disposed in the receiving groove, and the gear column is engaged with the annular rack of the second sleeve, wherein the force provided by the first drive element is applied on the gear column to transmit the force to the second sleeve through the gear column as a transmission element.

In the retractable camera module according to the embodiment of the present invention, the first driving element is a stepping motor.

In the retractable camera module according to the embodiment of the present invention, the first driving element is an annular ultrasonic motor.

In the retractable camera module according to the embodiment of the present invention, the bottom of the second sleeve is provided on the mover of the annular ultrasonic motor.

In the retractable camera module according to the embodiment of the present invention, the retractable camera module further comprises a second driving element for driving the photosensitive assembly.

In the retractable camera module according to the embodiment of the present invention, the second driving element is configured to drive the photosensitive assembly to move along the photosensitive path to perform optical focusing.

In the retractable camera module according to the embodiment of the present invention, the second driving element is configured to drive the photosensitive assembly to move, so as to perform optical anti-vibration.

In the retractable camera module according to the embodiment of the present invention, the retractable camera module further comprises a guiding sleeve extended retractably between the photosensitive assembly and the upper end of the retractable sleeve assembly, wherein the guiding sleeve has a through hole corresponding to the lens and the photosensitive chip.

In the retractable camera module according to the embodiment of the present invention, the inner diameter of the guiding sleeve gradually increases from top to bottom.

According to another aspect of the present invention, an electronic device is also provided, which comprises: the above-mentioned retractable camera module.

Still further objects and advantages of the present invention will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

The above and other objects, features and advantages of the present invention will become more apparent from the detailed description of the embodiments of the present invention in conjunction with the accompanying drawings. The accompanying drawings are used to provide a further understanding of the embodiments of the present invention, constitute a part of the specification, and are used to explain the present invention together with the embodiments of the present invention, and do not constitute a limitation to the present invention. In the drawings, the same reference numbers generally refer to the same components or steps.

DETAILED DESCRIPTION OF THE EMBODIMENTS

Hereinafter, example embodiments according to the present application will be described in detail with reference to the accompanying drawings. Obviously, the described embodiments are only a portion of the embodiments of the present application and not all of the embodiments of the present application, and it should be understood that the present application is not limited by the exemplary embodiments described herein.

Exemplary Retractable Camera Module

Figure 1:
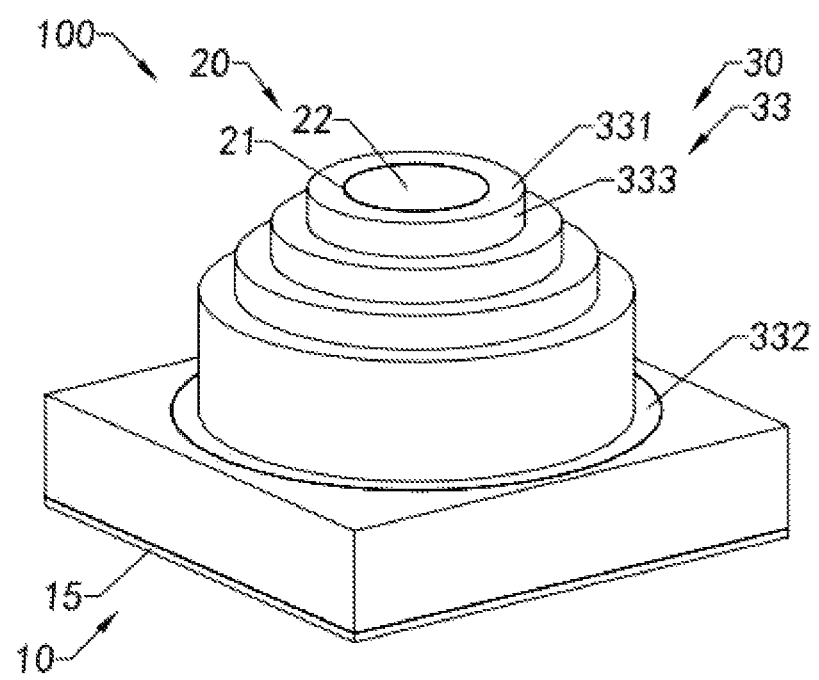
FIG. 1 is a schematic structural diagram of a retractable camera module according to an embodiment of the present invention, which is in a working state.
Figure 2:
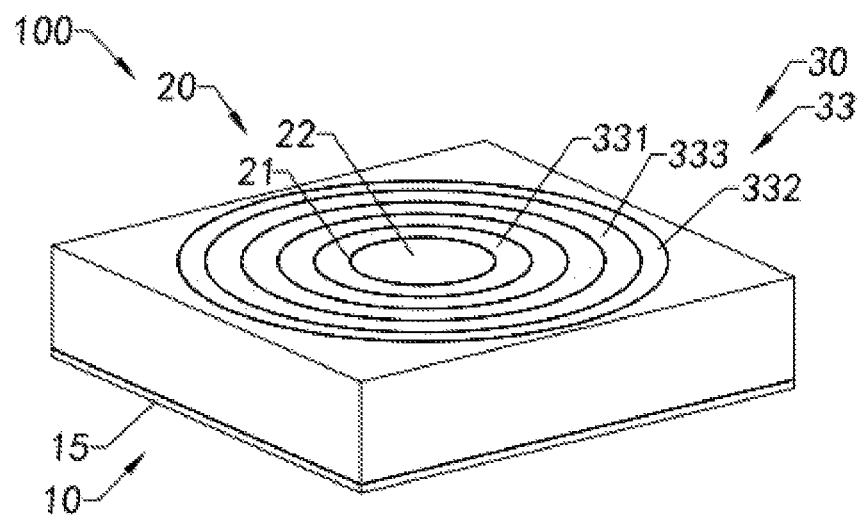
FIG. 2 is a schematic structural diagram of the retractable camera module according to the embodiment of the present invention, which is in a non-working state.
Figure 3:
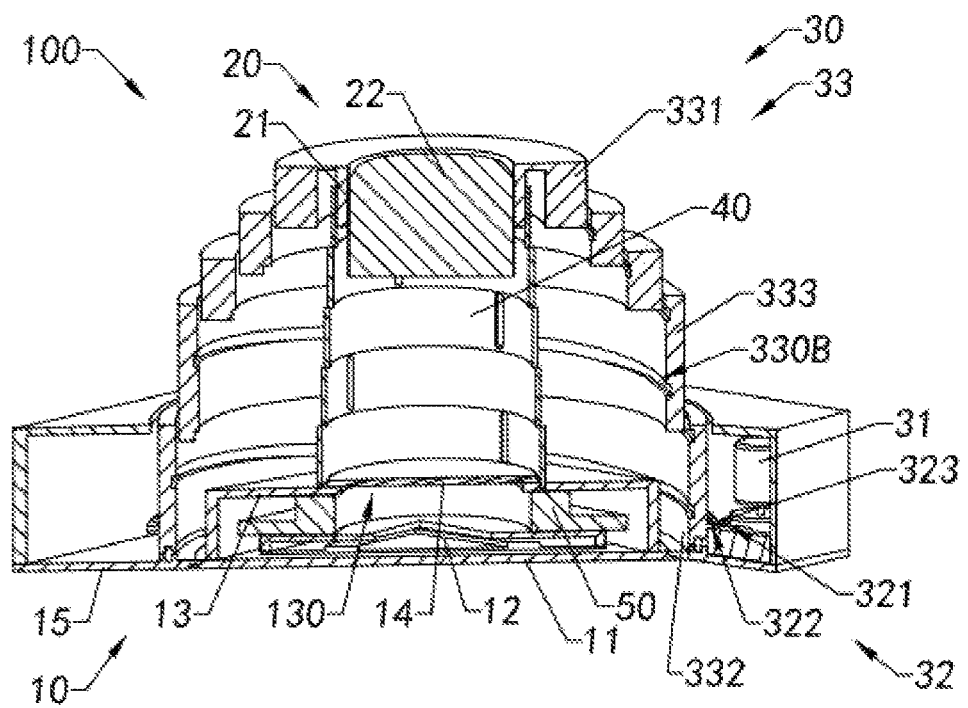
FIG. 3 is a schematic three-dimensional cross-sectional view of the retractable camera module according to the embodiment of the present invention.

As shown in FIG. 1 to FIG. 3, the retractable camera module based on the embodiment of the present invention is illustrated, wherein the retractable camera module 100 comprises: a photosensitive assembly 10, a lens 20 held in a photosensitive path of the assembly 10, and a retractable assembly 30 for adjusting a relative positional relationship between the lens 20 and the photosensitive assembly 10.

More specifically, in the embodiment of the present invention, the lens 20 comprises a lens barrel 21 and at least one optical lens 22 installed within the lens barrel 21. Those skilled in the art should know that the resolution ability of the lens 20 is proportional to the number of the optical lenses 22, that is, the higher the resolution ability, the greater the number of the optical lenses 22. Therefore, preferably, in the embodiment of the present invention, the lens 20 comprises a plurality of optical lenses 22, for example, 4, 5 or 6 optical lenses 22.

Moreover, in the embodiment of the present invention, the lens 20 has a larger effective focal length, so that the retractable camera module 100 can be applied as a telephoto camera module. More specifically, in the embodiments of the present invention, the effective focal length of the lens 20 is 19 mm to 29 mm. For example, when the retractable camera module 100 is used to achieve 5× optical zoom, the effective focal length of the lens 20 is 19 mm to 23 mm; preferably, the range of the effective focal length of the lens 20 is 20 mm to 22 mm. For another example, when the retractable camera module 100 is used to achieve 10× optical zoom, the range of the effective focal length of the lens 20 is 26 mm to 30 mm; preferably, the range of the effective focal length of the lens 20 is 27 mm to 29 mm.

It is worth mentioning that, in the embodiment of the present invention, the type of the lens 20 is not limited by the present invention, and it can be implemented as an integrated lens, or can be implemented as a split lens. Specifically, when the lens 20 is implemented as an integrated optical lens, the lens barrel 21 has an integrated structure, and the plurality of optical lenses 22 are assembled within the lens barrel 21. When the lens 20 is implemented as a split lens, the lens barrel 21 comprises at least two cylindrical units, and the plurality of optical lenses 22 are assembled within the at least two cylindrical units respectively to form a plurality of lens units, the plurality of lens units are assembled together by means of active alignment to form the lens 20.

As shown in FIGS. 1 to 3, in the embodiment of the present invention, the photosensitive assembly 10 comprises: a circuit board 11, a photosensitive chip 12, a bracket 13 and a light filter 14, wherein the circuit board 11 serves as the installation base plate of the photosensitive assembly 10. In the embodiment of the present invention, the photosensitive chip 12 is electrically connected to the circuit board 11 (for example, the photosensitive chip 12 is electrically connected to the circuit board 11 through wires), so as to provide the control circuit and electric power required for operation to the photosensitive chip 12 through the circuit board 11. The bracket 13 is disposed on the circuit board 11 to support other components, wherein the bracket 13 has a light window 130 corresponding to at least one photosensitive area of the photosensitive chip 12. For example, in some specific examples of the present invention, the light filter 14 can be mounted on the bracket 13, so that the light filter 14 is held in a photosensitive path of the photosensitive chip 12, thus, during the process of ambient light passing through the light filter 14 to reach the photosensitive chip 12, the stray light in the ambient light can be filtered by the light filter 14 to improve imaging quality.

It is worth mentioning that in other examples of the present invention, the light filter 14 can also be mounted on the bracket 13 in other ways. For example, firstly, the light filter holder is provided on the bracket 13, and then the light filter 14 is mounted on the light filter holder, that is, in this example, the light filter 14 can be indirectly mounted on the bracket 13 via other supporters. Of course, in other examples of the present invention, the light filter 14 can also be installed in other positions of the retractable camera module 100, for example, the light filter 14 can be implemented as a filter film and is attached to a surface of a certain optical lens 22 of the lens 20, which is not limited by the present invention.

In order to increase the strength of the bottom of the photosensitive assembly 10, in some examples of the present invention, the photosensitive assembly 10 further comprises a bottom plate 15 disposed on a bottom surface of the circuit board 11, for example, a steel plate is provided on the bottom surface (i.e., the bottom plate is a steel plate), so that the strength of the circuit board 11 is reinforced by the steel plate. Correspondingly, the bottom plate 15 can be configured to have the same shape and size as the circuit board 11, so as to be stacked on the bottom surface of the circuit board 11 and strengthen the entirety of the circuit board 11. Of course, in some examples of the present invention, the size of the bottom plate 15 may be smaller than that of the circuit board 11, so as to strengthen partially the circuit board 11. Of course, in other examples of the present invention, the size of the bottom plate 15 may be larger than that of the circuit board 11, so as to be stacked on the back of the circuit board 11, the bottom plate 15 protrudes from a side portion of the circuit board 11, wherein the area where the bottom plate 15 protrudes from the circuit board 11 forms a new installation base plate, that is, in the embodiment of the present invention, the circuit board 11 and the bottom plate 15 can be used as an installation base plate of the photosensitive assembly 10 for mounting other parts thereon.

As shown in FIGS. 1 to 3, in the embodiment of the present invention, the retractable assembly 30 comprises: a first driving element 31, a transmission mechanism 32 and a retractable sleeve assembly 33, wherein the first driving element 31, the transmission mechanism 32 and the retractable sleeve assembly 33 cooperate to realize the adjustment of the relative positional relationship between the lens 20 and the photosensitive assembly 10.

Correspondingly, in the embodiment of the present invention, the retractable sleeve assembly 33 is mounted on the installation base plate of the photosensitive assembly 10, for example, can be mounted on the circuit board 11, or can be mounted on the area of the bottom plate 15 which protrudes from the circuit board 11. Preferably, in the embodiment of the present invention, the lower end 332 of the retractable sleeve assembly 33 is installed on the area of the bottom plate 15 which protrudes from the circuit board 11, so as to provide a flat mounting base surface having sufficient strength for the retractable sleeve assembly 33 through the bottom plate 15. In addition, when the retractable sleeve assembly 33 is installed on the bottom plate 15, the central axis of the retractable sleeve assembly 33 is preferably aligned with the central axis of the photosensitive chip 12, that is, preferably, when the retractable sleeve assembly 33 is mounted on the installation base plate of the photosensitive assembly 10, the retractable sleeve assembly 33 is also held in the photosensitive path of the photosensitive chip 12.

Further, as shown in FIGS. 1 to 3, in the embodiment of the present invention, the lens 20 is installed in the retractable sleeve assembly 33 to be held in the photosensitive path of the photosensitive chip 12, that is, in the embodiment of the present invention, the lens 20 and the retractable sleeve assembly 33 are structurally related. Specifically, in the example illustrated in FIGS. 1 to 3, the lens 20 is mounted on an upper end 331 of the retractable sleeve assembly 33, so that when the retractable sleeve assembly 33 is driven to move telescopically relative to the photosensitive chip 12, the lens 20 installed in the retractable sleeve assembly 33 can move following the movement of the retractable sleeve assembly 33 to adjust the relative positional relationship between the lens 20 and the retractable sleeve assembly 33.

It is worth mentioning that, in other examples of the present invention, the lens 20 may be installed at other positions of the retractable sleeve assembly 33, for example, installed at a position adjacent to the upper end 331 of the retractable sleeve assembly 33, or a middle position of the retractable sleeve assembly 33, which is not limited by the present invention. In addition, in some examples of the present invention, in order to reduce the lateral size of the retractable camera module 100, the lens barrel 21 may not be configured for the lens 20, and the barrel body of the retractable sleeve assembly 33 may be selected as the lens barrel 21 of the at least one optical lens 22, which is also not limited by the present invention.

Correspondingly, in the embodiment of the present invention, as shown in FIG. 1 and FIG. 2, the lens 20 can be telescopically moved relative to the photosensitive chip 12 through the retractable sleeve assembly 33 to be switched between a first state and a second state, wherein when in the first state, the retractable sleeve assembly 33 is driven to move upwardly relative to the photosensitive chip 12 to drive the lens 20 to move upwardly relative to the photosensitive chip 12, so as to increase the distance between the lens 20 and the photosensitive chip 12, as shown in FIG. 1.

As shown in FIG. 2, when in the second state, the retractable sleeve assembly 33 is driven to move downwardly relative to the photosensitive chip 12 to drive the lens 20 to move downwardly relative to the photosensitive chip 12, so as to reduce the distance between the lens 20 and the photosensitive chip 12. It should be understood that the first state is the working state of the retractable camera module 100, and the second state is the non-working state of the retractable camera module 100.

That is, in the embodiment of the present invention, compared with the traditional upright camera module, the retractable camera module 100 has two states: a working state (the first state) and a non-working state (the second state), wherein when in the working state, the lens 20 is stretched as the retractable sleeve assembly 33 is stretched upwardly, so that the distance between the lens 20 and the photosensitive chip 12 meets the shooting requirements (here, the shooting requirements mean that the total optical length between the lens 20 and the photosensitive chip 12 meets the shooting requirements); when in the non-working state, the lens 20 is retracted back as the retractable sleeve assembly 33 is retracted downwardly, so that the overall height dimension of the retractable camera module 100 is reduced to meet the size requirement of assembling the retractable camera module 100 in a terminal device. That is, in the working state and the non-working state, the distance between the lens 20 and the photosensitive chip 12 is adjusted by the retractable sleeve assembly 33, so that in the working state, the distance between the lens 20 and the photosensitive chip 12 meets the shooting requirements, and in the non-working state, the distance between the lens 20 and the photosensitive chip 12 is shortened as much as possible, so that the overall height dimension of the retractable camera module 100 is reduced as much as possible.

More specifically, when the retractable camera module 100 is in a working state, the retractable sleeve assembly 33 is driven to be stretched upwardly in a direction away from the photosensitive chip 12, from the moment, the overall height dimension of the retractable camera module 100 gradually increases, correspondingly, when the retractable sleeve assembly 33 is completely stretched, the overall height dimension of the retractable camera module 100 reaches a maximum value, here, for convenience of description, the maximum value is defined as the maximum height dimension, and the height dimension of the retractable camera module 100 represents the distance between the top surface and the bottom surface of the retractable camera module 100.

More specifically, when the retractable camera module 100 is in the non-working state, the retractable sleeve assembly 33 is driven to be retracted downwardly in a direction close to the photosensitive chip 12, from the moment, the overall height dimension of the retractable camera module 100 gradually reduces, correspondingly, when the retractable sleeve assembly 33 is completely retracted, the overall height dimension of the retractable camera module 100 reaches a minimum value, here, for convenience of description, the minimum value is defined as the minimum height dimension, and the height dimension of the retractable camera module 100 represents the distance between the top surface and the bottom surface of the retractable camera module 100.

Specifically, when the retractable camera module 100 is configured as a rear camera module of the terminal device, that is, when the retractable camera module 100 is installed on the back of the terminal device, the minimum height dimension is basically the same as the thickness of the terminal device. Here, the minimum height dimension is substantially consistent with the thickness of the terminal device, indicating that when the retractable camera module 100 is installed in the terminal device, its upper end surface is flush with the back of the terminal device, or, slightly below the back of the terminal device. Of course, according to actual needs, the upper end surface of the retractable camera module 100 can also be higher than the back surface of the terminal device, but generally speaking, for the sake of beauty, the protruding height cannot be too large, and can generally be controlled 0 mm to 5 mm.

Correspondingly, when the retractable camera module 100 is configured as a rear camera module of the terminal device, in the working state, the lens 20 of the retractable camera module 100 will be stretched out, so that the distance between the lens 20 and the photosensitive chip 12 meets the requirements for the optical back focus value of zoom shooting, so as to ensure the imaging quality. As shown in FIG. 1, in a working state, the height of the retractable camera module 100 is significantly larger than the thickness of the module body. It should be understood that, in a specific implementation, the maximum height size and the minimum height size depend on the requirements of the terminal device for the optical zoom magnification.

Specifically, taking the use of the retractable camera module to achieve 5× optical zoom as an example, the range of the minimum height size is 8 mm~11 mm, preferably, the range of the minimum height size is 9 mm~10 mm; the range of the maximum height dimension is 23 mm~26 mm, preferably, the range of the maximum height dimension is 24 mm~25 mm. Specifically, taking the use of the retractable camera module to achieve 10× optical zoom as an example, the range of the minimum height size is 9 mm~12 mm, preferably, the range of the minimum height size is 10 mm~11 mm; the range of the maximum height dimension is 28 mm~32 mm, preferably, the range of the maximum height dimension is 29 mm~31 mm.

In addition, when in the working state, the optical back focus value of the retractable camera module 100 can reach the maximum value, and when in the non-working state, the optical back focus value of the retractable camera module 100 can reach the minimum value. More specifically, taking the retractable camera module 100 being used for 5× optical zoom as an example, in the working state, the optical back focus value of the retractable camera module 100 is 13 mm~17 mm, preferably 14~16 mm; in a non-working state, the optical back focus value of the retractable camera module 100 is 1 mm~3 mm, preferably 1.5 mm~2.5 mm.

In addition, when he retractable camera module 100 is in the working state, the mechanical back focus value of the retractable camera module 100 is maximum and when in the non-working state, the mechanical back focus value of the retractable camera module 100 is minimum. Here, the mechanical back focus of the retractable camera module 100 represents the distance from the cut plane of the lower surface of the last optical lens 22 of the lens 20 to the image plane. The value of the mechanical back focus is relatively close to the optical back focus value of the retractable camera module 100, and is basically reduced by about 0.5 mm on the basis of the optical back focus value.

In addition, it should be understood that when the retractable camera module 100 is in a working state, the retractable sleeve assembly 33 is driven to be stretched upwardly in a direction away from the photosensitive chip 12. At this time, the overall height dimension of the retractable sleeve assembly 33 is gradually increased, and accordingly, when the retractable sleeve assembly 33 is completely stretched, the overall height dimension of the retractable sleeve assembly 33 reaches the maximum value. Correspondingly, when the retractable camera module 100 is in a non-working state, the retractable sleeve assembly 33 is driven to be retracted downwardly in a direction close to the photosensitive chip 12. The overall height dimension of the retractable sleeve assembly 33 is gradually decreased, and accordingly, when the retractable sleeve assembly 33 is completely retracted, the overall height dimension of the retractable sleeve assembly reaches the minimum value. Specifically, in the embodiment of the present invention, the minimum height dimension of the retractable sleeve assembly 33 is 6 mm~9 mm, and the maximum height dimension of the retractable sleeve assembly 33 is 18.6 mm~28.6 mm.

In order to realize that the retractable sleeve assembly 33 can telescopically move relative to the photosensitive chip 12, a driving force needs to be provided for the retractable sleeve assembly 33. As shown in FIG. 3, in the embodiment of the present invention, the driving force of the retractable sleeve assembly 33 is provided by the first driving element 31, that is, in the embodiment of the present invention, the retractable sleeve assembly 33 is a passive piece that requires an external driving force to drive its movement.

As shown in FIG. 3, it should be noted that in the embodiment of the present invention, the upper end 331 of the retractable sleeve assembly 33 which is mounted on the lens 20 corresponds to the photosensitive chip 12, and an unobstructed imaging path needs to be maintained between the lens 20 and the photosensitive chip 12, that is, other components that hinder imaging cannot be provided between the lens 20 and the photosensitive chip 12. Therefore, in the embodiment of the present invention, preferably, the first driving element 31 is arranged at a side of the photosensitive chip 12, that is, the first driving element 31 is arranged at a certain position at the side of the photosensitive chip 12, for example, the first driving element 31 is installed at a certain position of the circuit board 11, which is located at the side of the photosensitive chip 12. In order to ensure the stability of the first driving element 31, more preferably, the first driving element 31 is installed at an area of the bottom plate 15, which is protruded from the circuit board 11.

Furthermore, considering that: on the one hand, the interior space of the retractable camera module 100 is limited, and on the other hand, the photosensitive chip 12, the light filter 14, etc. are sensitive and fragile elements, in some specific examples of the present invention, the first driving element 31 can be installed at an outer side of the retractable sleeve assembly 33. It should be understood that when the first driving element 31 is installed at the outer side of the retractable sleeve assembly 33, the deployment position of the driving assembly is also located at the side of the photosensitive chip 12 and is relatively farther away from the photosensitive chip 12. Of course, in some other specific examples of the present invention, the first driving element 31 can also be installed within the retractable sleeve assembly 33, so that the retractable camera module 100 has a more compact structural arrangement.

It should be understood that the function of the first driving element 31 is to provide a driving force for driving the retractable sleeve assembly 33 to stretch and retract. In a specific implementation, the force provided by the first driving element 31 can directly act on the retractable sleeve assembly 33 to drive the retractable sleeve assembly 33 to stretch and retract relative to the photosensitive chip 12.

Figure 4:
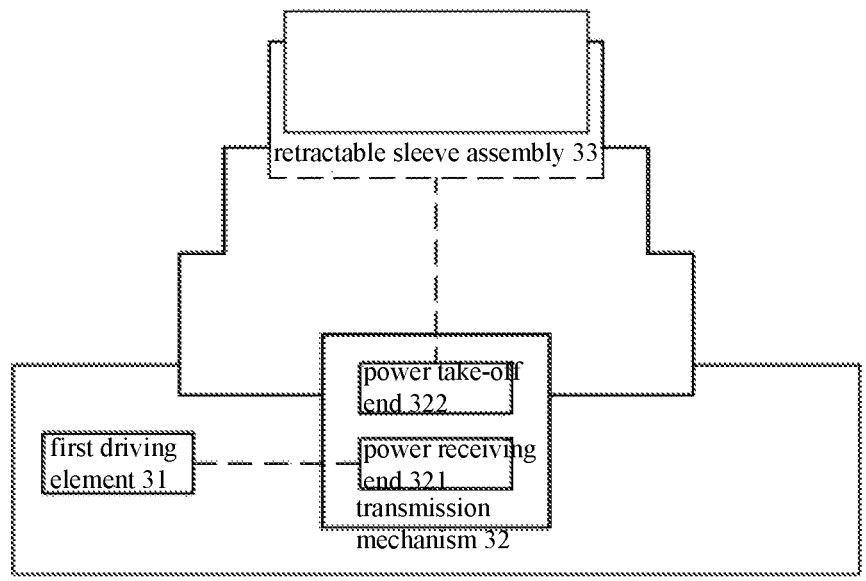
FIG. 4 is a block diagram illustrating a retractable assembly of the retractable camera module according to the embodiment of the present invention.
Figure 5:
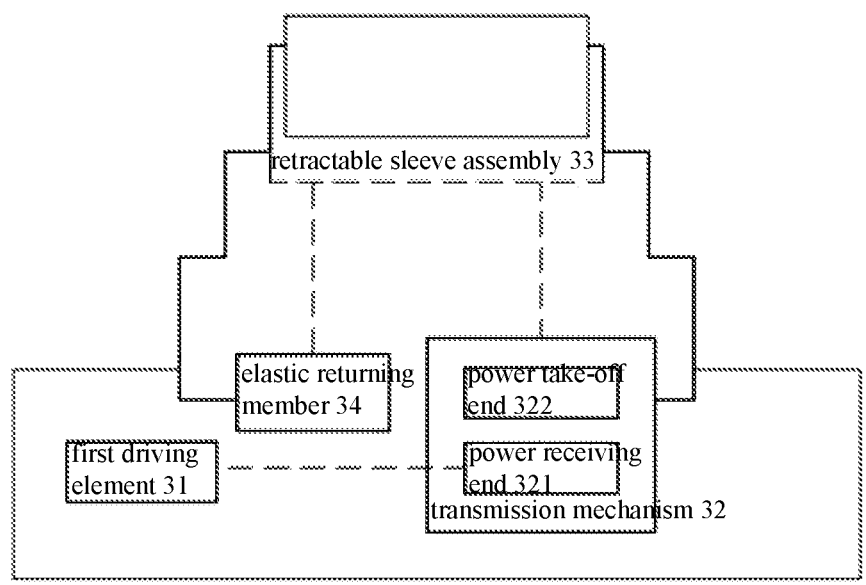
FIG. 5 is another block diagram illustrating the retractable assembly of the retractable camera module according to the embodiment of the present invention.

Further, considering the relative positional relationship between the retractable sleeve assembly 33 and the first driving element 31, the retractable assembly 30 further comprises a transmission mechanism 32 provided between the first driving element 31 and the retractable sleeve assembly 33 is used to transmit the driving force generated by the first driving element 31 to make it act on the retractable sleeve assembly 33 through the transmission mechanism 32, as shown in FIG. 4.

Correspondingly, the transmission mechanism 32 comprises a power receiving end 321 and a power take-off end 322, wherein the power receiving end 321 is coupled to the first driving element 31 to receive the driving force generated by the first driving element 31, the power take-off end 322 is used for outputting the driving force received by the power receiving end 321.

In some examples of the present invention, the power take-off end 322 can act on the upper end 331 of the retractable sleeve assembly 33, that is, the driving force generated by the first driving element 31 is transmitted and act on the upper end 331 of the retractable sleeve assembly 33 through the transmission mechanism 32 to drive the other parts of the retractable sleeve assembly 33 to move by driving the upper end 331, so as to achieve the purpose of driving the retractable sleeve assembly 33 to stretch and retract relative to the photosensitive chip 12.

It is worth mentioning that, in the embodiment of the present invention, the lens 20 is mounted on the upper end 331 of the retractable sleeve assembly 33, therefore, when the power take-off end 322 of the transmission mechanism 32 acts on the upper end 331 of the retractable sleeve assembly 33, the telescopic motion of the lens 20 and the retractable sleeve assembly 33 will be relatively more steady and smoother.

In particular, in these examples, since the first driving element 31 is provided on the side of the photosensitive chip 12, the power take-off 322 of the drive mechanism 32 acts on the upper end 331 of the retractable sleeve assembly 33 (the upper end 331 corresponds to the photosensitive chip 12), and in such a positional relationship, preferably, the driving mechanism 32 further comprises a steering element 323 for steering the driving force generated by the first driving element 31, the steering element 323 is provided between the first driving element 31 and the upper end 331 of the retractable sleeve assembly 33. It should be understood that by configuring the steering element 323, the driving force generated by the first driving element 31 can be more smoothly transmitted to the upper end 331 of the retractable sleeve assembly 33. In a specific implementation, the steering element 323 comprises, but is not limited to, pulleys, gears, crank connecting rods, and the like.

In some other examples of the present invention, the power take-off end 322 can also act on the lower end 332 of the retractable sleeve assembly 33, that is, the driving force generated by the first driving element 31 is transmitted and act on the lower end 332 of the retractable sleeve assembly 33 through the transmission mechanism 32 to drive the other parts of the retractable sleeve assembly 33 to move by driving the lower end 332, so as to achieve the purpose of driving the retractable sleeve assembly 33 to stretch and retract relative to the photosensitive chip 12.

Of course, in other examples of the application, the power take-off end 322 can also act on other positions of the retractable sleeve assembly 33, for example, the middle position, the middle upper position, the middle lower position of the retractable sleeve assembly 33, etc., are not limited by the present invention. It is worth mentioning that in other examples of the present invention, the power take-off end 322 can also directly act on the lens 20, that is, the power take-off end 322 can directly act on the lens 20 mounted on the upper end 331 of the retractable sleeve assembly 33.

It is also worth mentioning that, in some other examples of the present invention, the first driving element 31 can also drive the retractable sleeve assembly 33 to perform telescopic movement relative to the photosensitive chip 12 in other ways. For example, in some examples of the present invention, the retractable assembly 30 further comprises an elastic resetting member 34 disposed between the photosensitive chip 12 and the upper end 331 of the retractable sleeve assembly 33, one end of the elastic resetting member 34 is pressed on and in contact with the upper end 331 of the retractable sleeve assembly 33, wherein, in a natural state, the elastic resetting member 34 will return upwardly due to its own elasticity, so as to drive the retractable sleeve assembly 33 to do a stretching movement away from the photosensitive chip 12. Correspondingly, in these examples, the first driving element 31 may act on the upper end 331 of the retractable sleeve assembly 33 or the lens 20 through the transmission mechanism 32 (e.g., lead wire) to provide a driving force for pulling back the retractable sleeve assembly 33 or the lens 20. Correspondingly, in the process of pulling back the elastic resetting member 34 by the driving mechanism, the elastic resetting member 34 is compressed and the driving force applied to the retractable sleeve assembly 33 or the lens 20 by the driving mechanism is balanced with the elastic force of the elastic resetting member 34, so that the lens 20 can be pulled back and kept in a non-working state. That is, in these examples, the first driving element 31 directly acts on the retractable sleeve assembly 33 (or the lens 20) to drive the retractable sleeve assembly 33 to retract back relative to the photosensitive chip 12, and the stretching movement of the retractable sleeve assembly 33 relative to the photosensitive chip 12 are driven by the elastic resetting member 34, instead of being directly driven by the first driving element 31.

Correspondingly, in these examples, since the first driving element 31 is provided on the side of the photosensitive chip 12, the power take-off 322 of the drive mechanism 32 acts on the upper end 331 of the retractable sleeve assembly 33 (the upper end 331 corresponds to the photosensitive chip 12). In such a positional relationship, preferably, the driving mechanism 32 further comprises a steering element 323 for steering the driving force generated by the first driving element 31, the steering element 323 is provided between the first driving element 31 and the upper end 331 of the retractable sleeve assembly 33. It should be understood that by configuring the steering element 323, the driving force generated by the first driving element 31 can be more smoothly transmitted to the upper end 331 of the retractable sleeve assembly 33. In a specific implementation, the steering element 323 comprises, but is not limited to, pulleys, gears, crank connecting rods, and the like.

Further, in these examples, in order to enable the retractable camera module 100 to be kept in a non-working state, the retractable assembly 30 may further comprise a limiting element, wherein when the lens 20 is pulled back by the first driving element 31, the limiting element can prevent the retractable sleeve assembly 33 from being rebounded back by the elastic resetting member 34 by restricting the transmission mechanism 32 (e.g., a rope). In a specific implementation, the limiting element can be implemented as the first driving element 31 itself, that is, when in a non-operating state, the first driving element 31 can still provide a protection force for prevent the retractable sleeve assembly 33 from being rebounded back. Of course, the limiting element may also be an element disposed outside the first driving element 31, which is not limited by the present invention.

Figure 6:
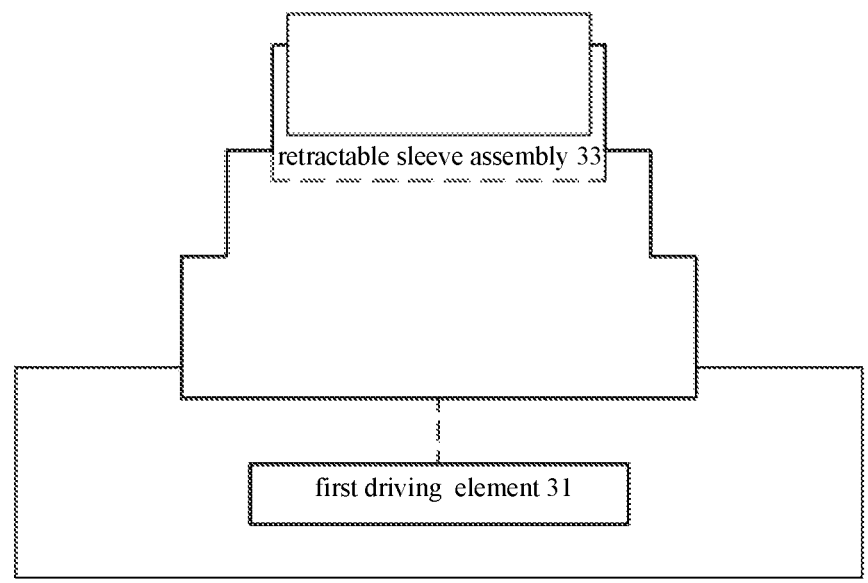
FIG. 6 is another block diagram illustrating the retractable assembly of the retractable camera module according to the embodiment of the present invention.

It is worth mentioning that, in some examples of the present invention, the first driving element 31 can directly act on the retractable sleeve assembly 33, the transmission mechanism 32 arranged between the first driving element 31 and the retractable sleeve assembly 33 is unnecessary, as shown in FIG. 6.

Further, when the retractable camera module 100 is in the working state, the lens 20 is moved away from the photosensitive chip 12 under the action of the retractable sleeve assembly 33, so that the lens 20 is moved away from the photosensitive chip 12 to make the distance between the photosensitive chip 12 and the lens 20 meets the shooting requirements. Correspondingly, since the distance between the lens 20 and the photosensitive chip 12 is increased, the imaging optical path between the lens 20 and the photosensitive chip 12 is lengthened, resulting in a greater likelihood of external stray light entering said light-sensitive chip 12 to impact the imaging quality.

In order to solve the problem that stray light affects imaging, in some examples of the present invention, the retractable camera module 100 further comprises a guiding sleeve 40 retractably extended between the photosensitive chip 12 and the retractable sleeve assembly 33, the guiding sleeve 40 has a through hole corresponding to the lens 20 and the photosensitive chip 12. It should be understood that, on the one hand, the guiding sleeve 40 disposed between the lens 20 and the photosensitive chip 12 can constrain the imaging light from the lens 20, on the other hand, the photosensitive chip 12 can isolate stray lights from the outside of the guiding sleeve 40 to prevent them from entering the photosensitive chip 12, through its own shape and size design.

In a specific example of the present invention, as shown in FIG. 3, one end of the guiding sleeve 40 is fixed to the upper end 331 of the retractable sleeve assembly 33, and another end of the guiding sleeve 40 is fixed above the photosensitive chip 12 (For example, it is fixed on the bracket 13), wherein when in the first state, the retractable sleeve assembly 33 is driven to move upwardly relative to the photosensitive chip 12 to drive the guiding sleeve 40 to be elongated relative to the photosensitive chip 12; when in the second state, the retractable sleeve assembly 33 is driven to move downwardly relative to the photosensitive chip 12 to drive the guiding sleeve 40 to be shortened downwardly relative to the photosensitive chip 12. That is, in this specific example, the guiding sleeve 40 is capable of stretching and retracting along with the retractable sleeve assembly 33.

In order to ensure that enough imaging light enters the photosensitive chip 12, in the embodiment of the present invention, preferably, the inner diameter of the guiding sleeve 40 is gradually increased from top to bottom, and a projection area of a lower end surface of the guiding sleeve 40 can cover the photosensitive area of the photosensitive chip 12. That is, the lower end surface of the guiding sleeve 40 can completely cover the photosensitive area of the photosensitive chip 12, so that the imaging light entering the photosensitive chip 12 through the guiding sleeve 40 can completely cover the photosensitive area of the photosensitive chip 12.

Further, as shown in FIGS. 1 to 3, in the embodiment of the present invention, the retractable sleeve assembly 33 has a multi-section structure, that is, the retractable sleeve assembly 33 comprises a plurality of mutually nested sleeve units 333. Wherein, the plurality of multi-section sleeve units 333 can interact with each other, so as to be capable of stretching relative to the photosensitive chip 12 or retracting relative to the photosensitive chip 12 after being driven. Here, the multi-section sleeve units 333 can interact with each other, which means that there is force transmission or direct contact between the multi-section sleeve units 333. Preferably, in the embodiment of the present invention, two adjacent sleeve units 333 of the plurality of sleeve units 333 are in contact with each other, for example, they are arranged in a layer-by-layer nesting manner, so as to form all the retractable sleeve assembly 33.

For example, in some specific examples of the present invention, the plurality of multi-section sleeve units 333 of the retractable sleeve assembly 33 are sleeved with each other, and a guiding groove 330A is defined between two adjacent sleeve units 333 (e.g., as shown in FIG. 6), and the guiding groove 330A allows telescopic movement between the inner and outer two sleeve units 333 in the direction of the optical axis. In some other examples of the present invention, the plurality of multi-section sleeve units 333 of the retractable sleeve assembly 33 are sleeved with each other, and a guide rail 330B is provided between two adjacent sleeve units 333 (for example, as shown in FIG. 3), the guide rail 330B allows a helical telescopic movement between the inner and outer two sleeve units 333 in the direction of the optical axis, that is, the inner sleeve unit 333 can perform a helix upward motion or a helix downward motion under the action of the outer sleeve unit 333.

In the embodiment of the present invention, a lower end 332 of the outermost sleeve unit 333 of the multi-section sleeve units 333 forms the lower end 332 of the retractable sleeve assembly 33, and an upper end 331 of the innermost sleeve unit 333 of the multi-section sleeve units 333 forms the upper end 331 of the retractable sleeve assembly 33, that is, in the embodiment of the present invention, the lens 20 is installed in the innermost sleeve unit 333, the outermost sleeve unit 333 is mounted on the installation base plate of the photosensitive assembly 10.

Correspondingly, when the retractable sleeve assembly 33 is driven in the working state, the outermost sleeve units 333 are fixed, and the inner sleeve units 333 are stretched upwardly one by one to move away from the photosensitive chip 12, so that the total optical length between the lens 20 and the photosensitive chip 12 can be increased to meet the shooting requirements.

In a specific implementation, the structural configuration between the multi-section sleeve units 333 is determined based on the driving mode of the retractable assembly 30. Specifically, as mentioned above, in some examples, in the working state, the power take-off end 322 of the transmission mechanism 32 of the retractable assembly 30 directly acts on the upper end 331 of the retractable sleeve assembly 33, under the action of the power take-off end 322, the innermost sleeve unit 333 is lifted up to drive the outer sleeve units 333 to move upwardly layer by layer. In this way, the lens 20 is kept away from the photosensitive chip 12. In this driving mode, the multi-section sleeve units 333 may adopt a structural configuration in which the inner and outer sleeves are nested and the two adjacent sleeve units 333 can slide up and down relative to each other.

Specifically, as mentioned above, in some examples, in the working state, the power take-off end 322 of the transmission mechanism 32 of the retractable assembly 30 directly acts on the upper end 332 of the retractable sleeve assembly 33, under the action of the power take-off end 322, the innermost sleeve unit 333 is lifted up to drive the outer sleeve units 333 to move upwardly layer by layer, in this way, the lens 20 is drive away from the photosensitive chip 12. In this driving mode, the multi-section sleeve units 333 may adopt a structural configuration in which the inner and outer sleeves are nested and the two adjacent sleeve units 333 can slide up and down relative to each other helically.

It is worth mentioning that, as mentioned above, in the embodiment of the present invention, the minimum height of the retractable camera module 100 should meet the predetermined requirements. Therefore, in the embodiment of the present invention, the height of each sleeve unit 333 of the multi-section sleeve unit 333 is not higher than the required height of the retractable camera module 100. For example, when the height of the retractable camera module 100 is 9.5 mm, the height of each sleeve unit 333 is less than or equal to 9.5 mm. Preferably, in the embodiment of the present invention, each of the sleeve units 333 in the multi-section sleeve units 333 has a consistent height dimension.

In addition, it should be easily understood that, in the embodiment of the present invention, the highest height dimension of the retractable camera module 100 is determined by the height dimension of each sleeve unit 333 of the multi-section sleeve units 333 and the total number of the multi-section sleeve units 333. That is, to a certain extent, the maximum height dimension of the retractable camera module 100 can be controlled by controlling the number of the multi-section sleeve units 333. That is, in the embodiment of the present invention, the number of the multi-section sleeve units 333 is determined based on the quotient of the maximum height dimension of the retractable sleeve assembly 33 and the height of the sleeve unit 333.

For example, in a specific example, the height dimension of the sleeve unit 333 is equal to the minimum height dimension of the retractable sleeve assembly 33, and the multi-section sleeve units 333 have consistent height dimensions, and the maximum height dimension of the retractable sleeve assembly 33 is equal to the sum of the height dimensions of the multi-section sleeve units 333.

In order to better understand the design of the height and the number of the multi-section sleeve units 333 of the retractable sleeve assembly 33, a specific example is provided.

In this specific example, the height requirement of the terminal device for the retractable camera module 100 is 9.5 mm, the effective focal length of the lens 20 of the retractable camera module 100 is 21 mm, and the total optical length of the camera module 100 is also 21 mm, and the height dimension of the lens 20 is 7.3-7.5 mm. In this specific example, in the working state, the height of 24 mm is required between the lens 20 and the photosensitive chip 12, the height of the lens 20 is 7.3 mm, and the retractable camera module 100 needs a height dimension of 9.5 mm, therefore, the retractable assembly 30 must be provided for the lens 20, so that the lens 20 is in a corresponding height position in the working state to make the TTL meet the requirements and the module 100 shoot normally.

In this specific example, the outermost sleeve unit 333 of the retractable sleeve assembly 33 is fixed on the circuit board 11 or other fixing parts (for example, the bottom plate 15 as described above), the overall stretch length of the retractable sleeve assembly 33 is approximately 24 mm. In order to allow the retractable sleeve assembly 33 to be completely retracted into the retractable camera module 100, the height of each sleeve unit 333 is less than 9.5 mm (it is worth mentioning that due to the existence of all the height of the circuit board 11 and other components, the height of each sleeve unit 333 may need to be further controlled), therefore, the number of the multi-section sleeve units 333 of the retractable sleeve assembly 33 should be at least three.

Further, in the embodiment of the present invention, since the motion control precision of the retractable assembly 30 is limited, and in the specific shooting process, the relative positional relationships between the retractable camera module 100 and the subjects are various, therefore, when using the retractable camera module 100 for shooting, preferably, the retractable camera module 100 also needs to be focused and/or optically stabilized to improve the shooting quality. That is, in the embodiment of the present invention, the retractable camera module 100 further comprises a second driving element 50.

In a specific example of the present invention, the second driving element 50 is disposed between the retractable sleeve assembly 33 and the lens 20, and is configured to drive the lens 20 to fine-tune the relative positional relationship between the lens 20 and the photosensitive chip 12 for optical focusing and/or optical anti-shake. Specifically, the second driving element 50 comprises, but is not limited to, a voice coil motor, piezoelectric ceramics, and the like.

In another specific example of the present invention, the second driving element 50 may be configured to act on a certain position of the retractable sleeve assembly 33, for example, act on the innermost sleeve unit 333 of the retractable sleeve assembly 33 to optical focus and/or optical anti-shake by driving a whole of the retractable sleeve assembly 33 and the lens 20.

In still another specific example of the present invention, the second driving element 50 may be configured to act on the photosensitive chip 12, that is, the second driving element 50 drives the photosensitive chip 12 to move to fine-tune the relative positional relationship between the photosensitive chip 12 and the lens 20 to optical focus and/or optical anti-shake.

To sum up, the retractable camera module 100 is illustrated based on the embodiment of the present invention, wherein the lens 20 of the retractable camera module 100 is retractable relative to the photosensitive chip 12 thereof to be switched between the working state and the non-working state, wherein in the working state, the lens 20 of the retractable camera module 100 is stretched for imaging, and in the non-working state, the lens 20 of the retractable camera module 100 20 is retracted to reduce the overall height dimension of the retractable camera module 100, in this way, the technical contradiction between the height design and the larger effective focal length of the conventional vertical camera module is resolved.

Exemplary Retractable Assembly 1

Figure 7:
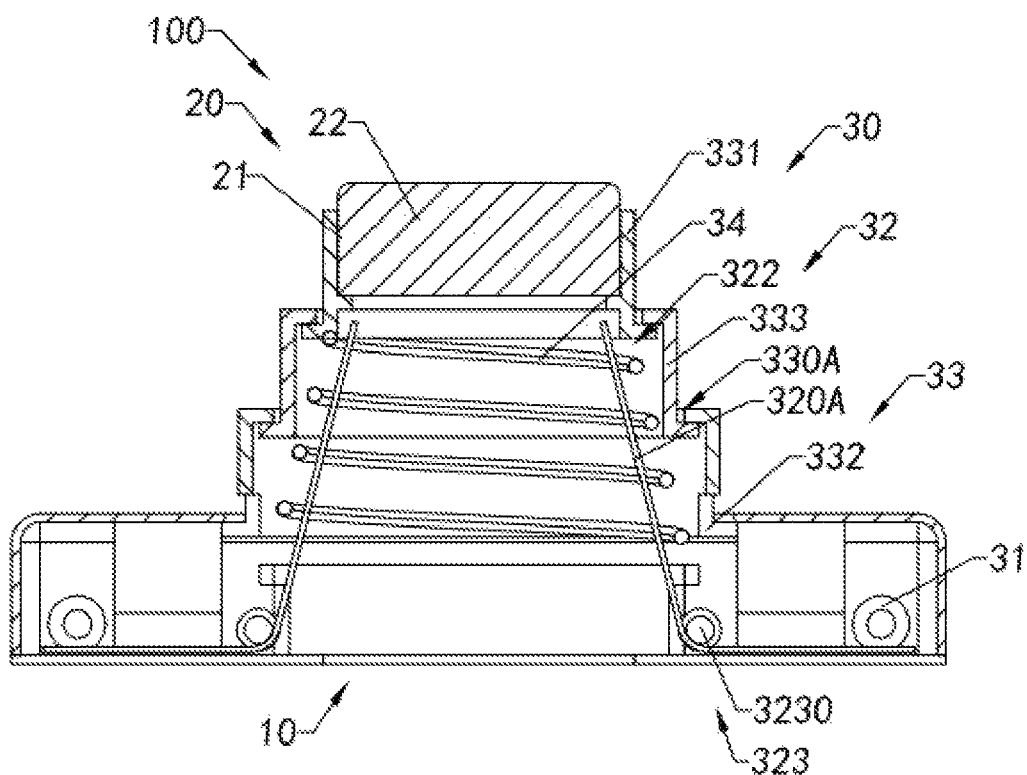
FIG. 7 is a schematic perspective view illustrating a specific example of the retractable assembly of the retractable camera module according to the embodiment of the present invention.
Figure 8:
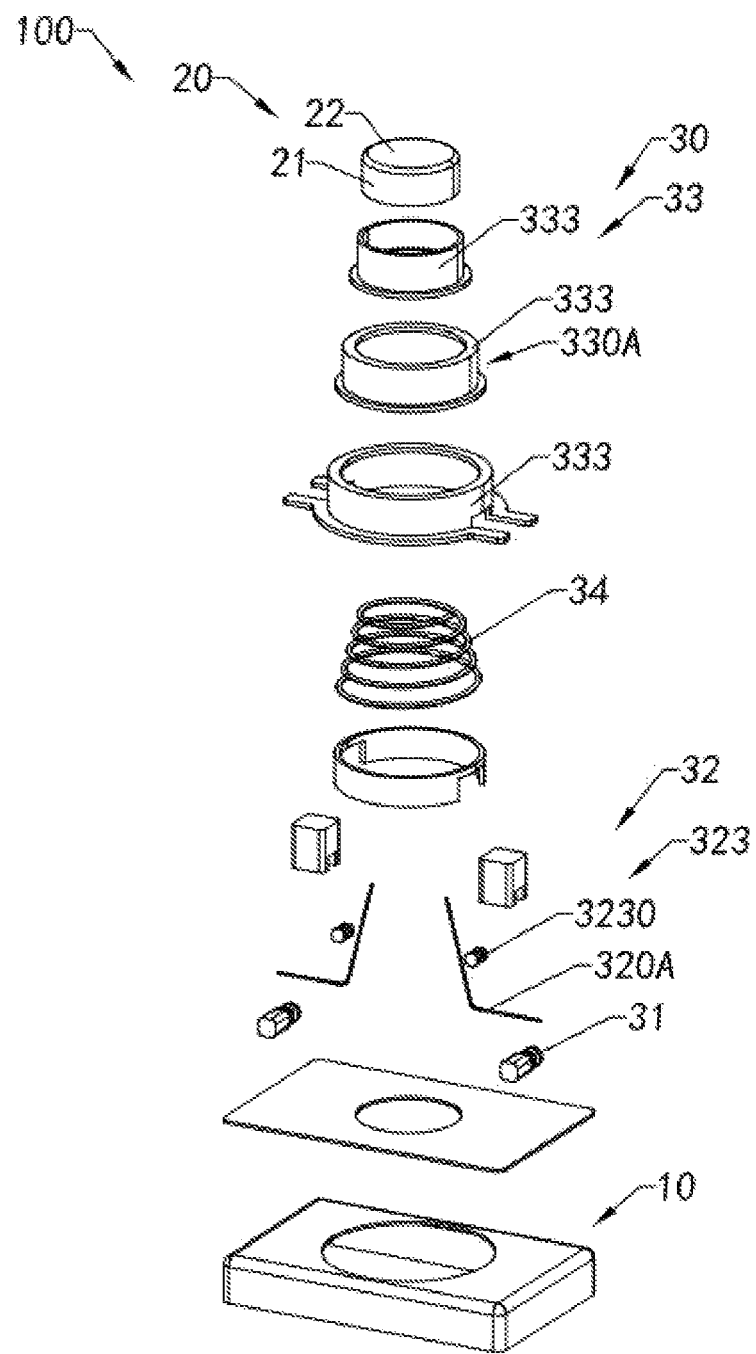
FIG. 8 is a schematic exploded perspective view illustrating the retractable assembly shown in FIG. 7.

FIG. 7 is a schematic perspective view illustrating a specific example of the retractable assembly 30 of the retractable camera module 100 according to an embodiment of the present invention. FIG. 8 is a schematic exploded view illustrating the retractable camera module according to the embodiment of the present invention. As shown in FIGS. 7 and 8, in this specific example, the retractable assembly 30 comprises: a first driving element 31, a transmission mechanism 32 and an elastic resetting member 34, wherein the first driving element 31, the transmission mechanism 32 and the elastic resetting member 34 are cooperated to drive the retractable sleeve assembly 33 to be switched between the working state and the non-working state.

Specifically, as shown in FIG. 7 and FIG. 8, in this specific example, the first driving element 31 is provided at a side of the photosensitive chip 12, for example, the first driving element 31 is mounted at a certain position of the circuit board 11, which is located at the side of the photosensitive chip 12. In order to improve the installation stability of the first driving element 31, in other examples of the present invention, the first driving element 31 can be installed on an area of the bottom plate 15, which is protruded from the circuit board 11. In some specific example, when the first driving element 31 is installed at the area of the bottom plate 15 which is protruded from the circuit board 11, the first driving element 31 is located outside the retractable sleeve assembly 33.

As shown in FIG. 7 and FIG. 8, in this specific example, the transmission mechanism 32 comprises a lead wire 320A, and one end of the lead wire 320A is connected to the first driving element 31 for transmitting the force generated from the first driving element 31, another end of the lead wire 320A is fixed to the retractable sleeve assembly 33 or to the lens 20 of the retractable sleeve assembly 33. Preferably, when another end of the lead wire 320A is fixed to the retractable sleeve assembly, another end of the lead wire 320A is fixed to the upper end 331 of the retractable sleeve assembly 33. That is, in this example, the power take-off end 322 of the transmission mechanism 32 acts on the upper end 331 of the retractable sleeve assembly 33 or the lens 20.

Correspondingly, when the retractable camera module 100 is controlled to be switched from the working state to the non-working state, the first driving element 31 can be activated to generate a force for pulling the lead wire 320A, so as to pull the retractable sleeve assembly 33 or the lens 20 to be retracted downwardly to the non-operating state.

Further, in order to enable the retractable sleeve assembly 33 to return to its working state, as shown in FIG. 7 and FIG. 8, in this specific example, the retractable assembly 30 further comprises the elastic resetting member 34 between the upper end 331 of the retractable sleeve assembly 33 and the circuit board 11. The elastic resetting member 34 can be implemented as a spring having elasticity, a leaf spring or the like.

Specifically, in the example shown in FIGS. 7 and 8, one end of the elastic resetting member 34 is fixed to the circuit board 11, and another end of the elastic resetting member 34 is fixed to the upper end 331 of the retractable sleeve assembly 33, in this way, the elastic resetting member 34 is disposed between the upper end 331 of the retractable sleeve assembly 33 and the circuit board 11.

Correspondingly, when the retractable camera module 100 is in a non-working state, the first driving element 31 utilizes the lead 320A as the transmission mechanism 32 to drive the retractable sleeve assembly 33 (or the lens 20) moves downwardly, wherein during the downward movement, the elastic resetting member 34 is compressed and reaches the corresponding position, the first driving element 31 exerts a force to make the elastic resetting member 34 is kept in a compressed state. When the retractable camera module 100 is in the working state, the force exerted by the first driving element 31 on the lead wire 320A is reduced or eliminated, so that the retractable sleeve assembly 33 is stretched under the action of the elastic force of the elastic resetting member 34 upwardly, to drive the lens 20 mounted on the retractable sleeve assembly 33 to stretch upwardly to increase the total optical length of the retractable camera module 100. That is, when the retractable camera module 100 is switched from the non-operating state to the working state, the compressed elastic resetting member 34 returns upwardly to drive the retractable sleeve assembly 33 to stretch upwardly, so as to make the lens 20 away from the photosensitive chip 12 to meet the shooting requirements.

It is worth mentioning that, in this specific example, preferably, the elastic resetting member 34 and the lead wire 320A are disposed below the retractable sleeve assembly 33, that is, disposed below the lens 20, through such a position setting, the elastic resetting member 34 and the lead wire 320A are reasonably arranged within a space defined by the retractable sleeve assembly 33, so as to improve the utilization rate inside the module and effectively control the overall size (especially the size in the height direction) of the retractable camera module 100.

It should be noted that, as shown in FIGS. 7 and 8, in this specific example, the lens 20 is mounted on the upper end 331 of the retractable sleeve assembly 33 and corresponds to the photosensitive chip 12, the first driving element 31 is located at one side of the photosensitive chip 12, that is, there is a certain horizontal distance between the lens 20 (the upper end 331 of the retractable sleeve assembly 33) and the first driving element 31. In order to facilitate the arrangement of the lead wire 320A, in the embodiment of the present invention, the transmission mechanism 32 further comprises at least one pulley 3230 as the steering element 323, so as to reduce the module interior space occupied by the lead wire 320A through the at least one pulley 3230.

In the specific example, the at least one pulley 3230 is disposed between the first driving element 31 and the photosensitive chip 12, preferably, the installation height of the at least one pulley 3230 is the same as the first driving element 31. For example, when the first driving element 31 is mounted on the circuit board 11 or an area of the bottom plate 15, which protrudes from the circuit board 11, the at least one pulley 3230 is mounted on the circuit board 11 to make the at least one pulley 3230 and the first driving element 31 have approximately the same installation height, so that the lead wire 320A between the first driving element 31 and the at least one pulley 3230 is kept almost horizontal, in order to make the transmission of the force smoother.

In this specific example, the number of the at least one pulley 3230 is consistent with the number of the lead wires 320A, that is, preferably, each lead wire 320A changes direction through the corresponding pulley 3230, wherein, the number of the lead wires 320A is greater than or equal to 1, for example, 2, 3 or 4. When the number of the lead wires 320A is greater than one, preferably, the arrangement of the lead wires 320A is evenly arranged with respect to the optical axis of the retractable camera module 100. In addition, the number of the lead wires 320A should not be too large. Too many lead wires 320A will occupy a larger module space, which is not conducive to the miniaturization of the module.

Further, as shown in FIG. 7 and FIG. 8, in the embodiment of the present invention, the multi-section sleeve units 333 of the retractable sleeve assembly 33 are sleeved with each other, and a guiding groove 330A is provided between two adjacent sleeve units 333, and the guiding groove 330A allows telescopic movement between the inner and outer two sleeve units 333 in the direction of the optical axis.

In particular, in the example, the retractable sleeve assembly 33 has a trapezoidal cross-section whose size gradually increases from the upper end 331 to the lower end 332. Preferably, in the specific example, the shape of the elastic resetting member 34 is matched with the shape of the retractable sleeve assembly 33, that is, in the specific example, the elastic resetting member 34 has a small upper part and a large lower part. Here, that the shape of the elastic resetting member 34 is matched with the shape of the retractable sleeve assembly 33 does not mean that the shape of the elastic resetting member 34 is consistent with the shape of the retractable sleeve assembly 33, but only means that the retractable sleeve assembly 33 has a small upper part and a large lower part. For example, in the example shown in FIG. 7 and FIG. 8, the elastic resetting member 34 is extended vertically and downwardly from top to bottom, and then is extended outwardly, so that the elastic resetting member 34 has a small upper part and a large lower part.

It is worth mentioning that, in order to keep the retractable camera module 100 in a non-working state, the retractable assembly 30 may further comprise a limiting element, wherein when the lens 20 is pulled back by the first driving element 31 through the lead wire 320A, the limiting element can prevent the retractable sleeve assembly 33 from being bounced back by the elastic resetting member 34 by restricting the lead wire 320A. In a specific implementation, the limiting element can be implemented as the first driving element 31 itself, that is, when in a non-operating state, the first driving element 31 can still provide a protection force for prevent the retractable sleeve assembly 33 from being rebounded back. Of course, the limiting element may also be an element disposed outside the first driving element 31, which is not limited by the present invention.

To sum up, the retractable assembly 30 based on the specific example of the present invention is illustrated, which realizes the retractable camera module 100 to be switched between the working state and the non-working state through the cooperation of the first driving element 31, the transmission mechanism 32 and the elastic resetting member 34. Moreover, since the elastic resetting member 34 can rebound quickly, the retractable camera module 100 can be switched to the working state at a fast speed, so as to improve the working efficiency.

Exemplary Retractable Assembly 2

Figure 9:
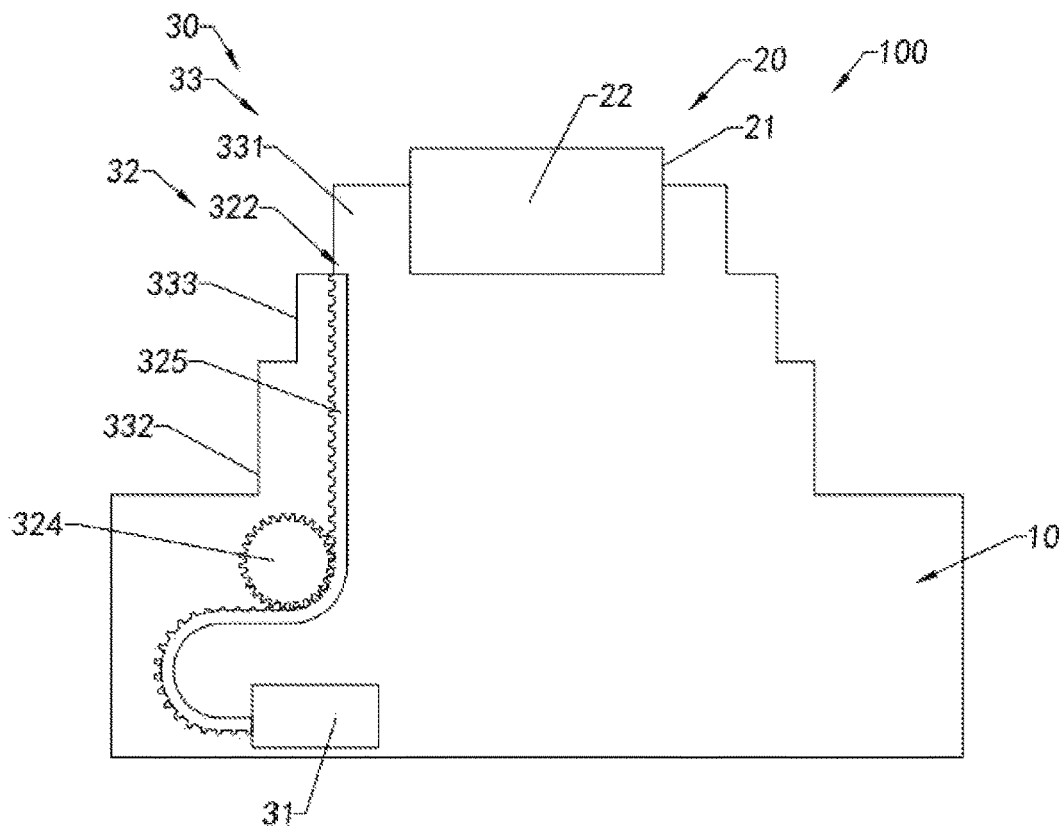
FIG. 9 is a schematic view illustrating another specific example of the retractable assembly of the retractable camera module according to the embodiment of the present invention.

FIG. 9 is a schematic perspective view illustrating another specific example of the retractable assembly 30 of the retractable camera module 100 according to another embodiment of the present invention. As shown in FIG. 9, in the specific example, the retractable assembly 30 comprises: a first driving element 31 and a transmission mechanism 32, wherein the transmission mechanism 32 comprises a gear 324 and a transmission member 325.

More specifically, in this specific example, the first driving element 31 is provided at a side of the photosensitive chip 12, for example, the first driving element 31 is mounted at a certain position of the circuit board 11, which is located at a side of the photosensitive chip 12. In order to improve the installation stability of the first driving element 31, in other examples of the present invention, the first driving element 31 can be installed on an area of the bottom plate 15, which is protruded from the circuit board 11. In some specific example, when the first driving element 31 is installed at the area of the bottom plate 15 which is protruded from the circuit board 11, the first driving element 31 is located outside the retractable sleeve assembly 33.

As shown in FIG. 9, one end of the transmission member is fixed to the retractable sleeve assembly 33 (for example, the upper end 331 of the retractable sleeve assembly 33), and another end of the transmission member can be transmitted is connected to the first driving element 31 through the gear 324 drivably. That is, in the specific example, the take-off end of the transmission mechanism 32 acts on the retractable sleeve assembly 33, for example, the upper end 331 of the retractable sleeve assembly 33. The function of the gear 324 is equivalent to the steering element 323, and its function is to steer the force generated by the first driving element 31 to drive the transmission member 325 to move along its transmission direction. It should be understood that, through the gear 324, the relative positional relationship between the first driving element 31 and the transmission member 325 can be arranged more freely, so as to more fully utilize the inner space of the module.

It is worth mentioning that, in other examples of the present invention, another end of the transmission member may also be directly fixed to the lens 20, which is not limited by the present invention.

It should be noted that, in the specific example, the transmission member is extended almost vertically between the upper end 331 of the retractable sleeve assembly 33 and the circuit board 11 (no reference numeral 11 in FIG. 9). Correspondingly, when the transmission member is actuated, the transmission member 325 can drive the upper end 331 of the retractable sleeve assembly 33 to stretch and retract relative to the photosensitive chip 12 along the transmission direction of the transmission member. That is, in the example of the present invention, the power take-off end 322 of the transmission mechanism 32 acts on the upper end 33 of the retractable sleeve assembly 33 or the lens 20.

Further, as shown in FIG. 9, in the embodiment of the present invention, the multi-section sleeve units 333 of the retractable sleeve assembly 33 are sleeved with each other, and a guiding groove 330A is provided between two adjacent sleeve units 333, and the guiding groove 330A allows telescopic movement between the inner and outer two sleeve units 333 in the direction of the optical axis. In the example, the retractable sleeve assembly 33 has a trapezoidal cross-section whose size gradually increases from the upper end 331 to the lower end 332.

Specifically, when the retractable camera module 100 is in the working state, the first driving element 31 generates a driving force in a first direction to drive the transmission member 325 to move upwardly through the gear 324, so as to drive the upper end 331 of the retractable sleeve assembly 33 or the lens 20 to move upwardly to increase the distance between the lens 20 and the photosensitive chip 12 to meet the shooting requirements. When the retractable camera module 100 is in a non-working state, the first driving element 31 generates a driving force opposite to the first direction to drive the transmission member 325 to move downwardly through the gear 324, so as to drive the upper end 331 of the retractable sleeve assembly 33 or the lens 20 to move downwardly to reduce the distance between the lens 20 and the photosensitive chip 12 and achieve the purpose of reducing the overall height dimension of the retractable camera module 100.

In a specific implementation, the transmission member 325 may be implemented as a conveyor chain or a conveyor belt. It is worth mentioning that, in a specific implementation, since the strength of the transmission belt is not necessarily sufficient to support the lens 20 to stretch or retract, therefore, in the specific example, a support member may also be provided for the transmission belt. Correspondingly, the transmission belt is mounted on the support member to prevent the transmission belt from being deformed by the support member, so as to ensure that the lens 20 can stretch or retract to a corresponding height.

It is worth mentioning that, in order to keep the retractable camera module 100 in a non-working state, the retractable assembly 30 may further comprise a limiting element, wherein the limiting element is used to limit the transmission movement of the transmission member 325. In a specific implementation, the limiting element can be implemented as the first driving element 31, that is, when in a non-operating state, the limiting element can limit the movement of the transmission member 325. Of course, the limiting element may also be an element disposed outside the first driving element 31, which is not limited by the present invention.

To sum up, the retractable assembly 30 based on the specific example of the present invention is illustrated, which realizes the purpose of switching the retractable camera module 100 between its working state and non-working state through the cooperation of the first driving element 31, the gear 324 and the transmission member 325.

Exemplary Retractable Assembly 3

Figure 10:
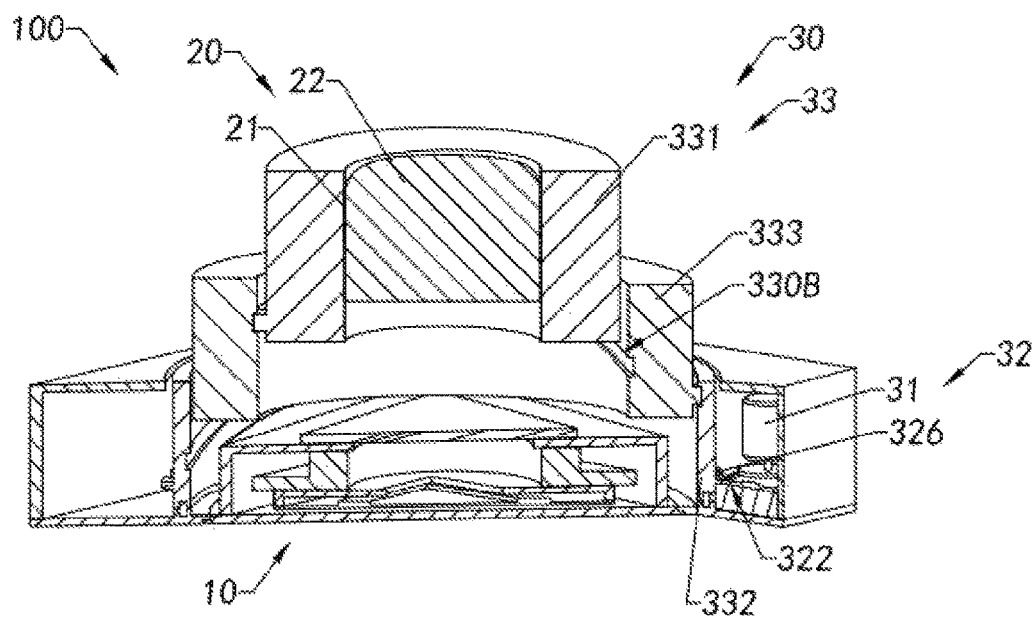
FIG. 10 is a schematic view illustrating another specific example of the retractable assembly of the retractable camera module according to the embodiment of the present invention.

FIG. 10 is a schematic perspective view illustrating another specific example of the retractable assembly 30 of the retractable camera module 100 according to another embodiment of the present invention. As shown in FIG. 10, in the specific example, the retractable assembly 30 comprises: a first driving element 31 and a transmission mechanism 32.

In particular, as shown in FIG. 10, the retractable sleeve assembly 33 comprises a plurality of multi-section sleeve units 333 which is nested with each other and a helical guiding rail 330B is provided between every two adjacent sleeve units 333, through such a structural configuration, when the outermost sleeve unit 333 is driven to rotate in a first direction (for example, the first direction is clockwise), an inner sleeve unit 333 helically and upwardly moves under the guidance of the helical guiding rail 330B; and when the outermost sleeve unit 333 is driven in a second direction (for example, the two directions are clockwise), the inner sleeve unit 333 helically and upwardly moves under the guidance of the helical guiding rail 330B.

As shown in FIG. 7, in this specific example, the first driving element 31 is provided at a side of the photosensitive chip 12, for example, the first driving element 31 is mounted at a certain position of the circuit board 11, which is located at a side of the photosensitive chip 12. In order to improve the installation stability of the first driving element 31, preferably, the first driving element 31 is installed at an area of the bottom plate 15, which is protruded from the circuit board 11. In some specific examples, when the first driving element 31 is installed at the area of the bottom plate 15 that protrudes from the circuit board 11, the first driving element 31 is located outside of the retractable sleeve assembly 33.

As shown in FIG. 10, in the specific example, the transmission mechanism 32 is provided between the first driving element 31 and the lower end 332 of the retractable sleeve assembly 33, so as to make the driving force generated by the first driving element 31 act on the lower end 332 of the retractable sleeve assembly 33 through the transmission mechanism 12. In the specific example, the transmission mechanism 32 is implemented as a gear transmission mechanism 326, and the lower end 332 of the retractable sleeve assembly 33 is engaged with the gear transmission mechanism 326, that is, in the specific example, the transmission mechanism 32 forms the power take-off end 322 of the transmission mechanism 32, and the power take-off end 322 acts on the lower end 332 of the retractable sleeve assembly 33.

Figure 11A:
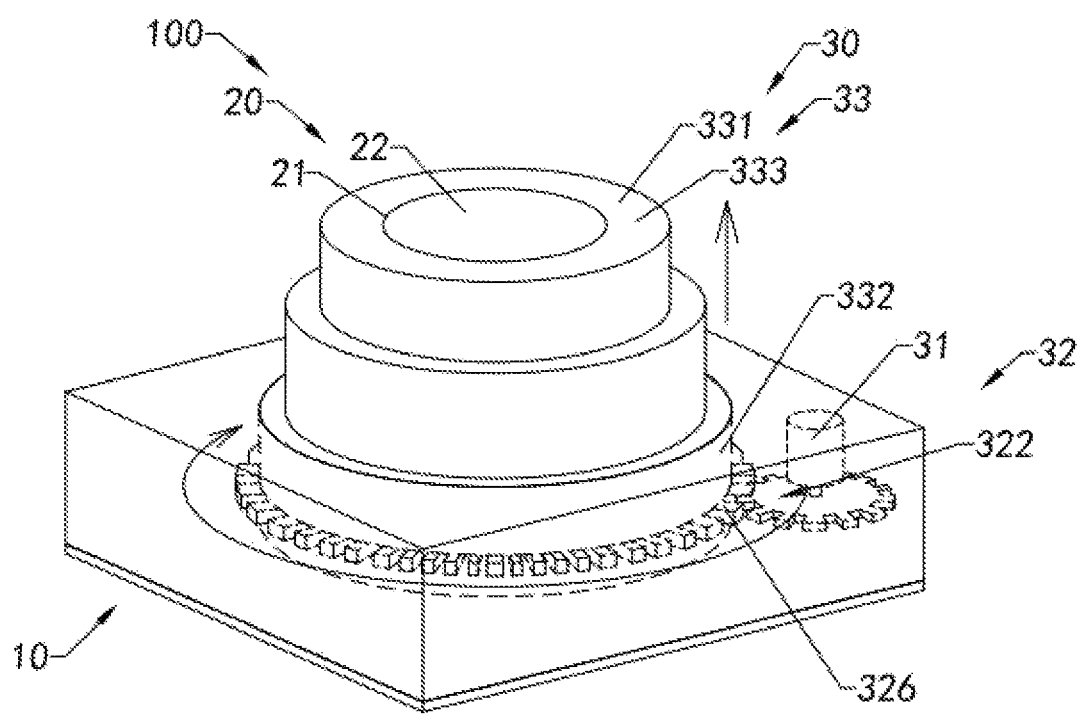
FIG. 11A is a schematic view illustrating the retractable assembly shown in FIG. 10, which is in the working state.

Specifically, when the retractable camera module 100 is in a working state, the first driving element 31 generates a driving force in a first direction to act on the lower end 332 of the retractable sleeve assembly 33 through the gear transmission mechanism 326. Correspondingly, under the action of the driving force, the outermost sleeve unit 333 of the retractable sleeve assembly 33 rotates in the first direction to drive the inner sleeve unit 333 to move helically and upwardly, so as to drive the lens 20 away from the photosensitive chip 12 to meet the shooting requirements, as shown in FIG. 11A.

Figure 11B:
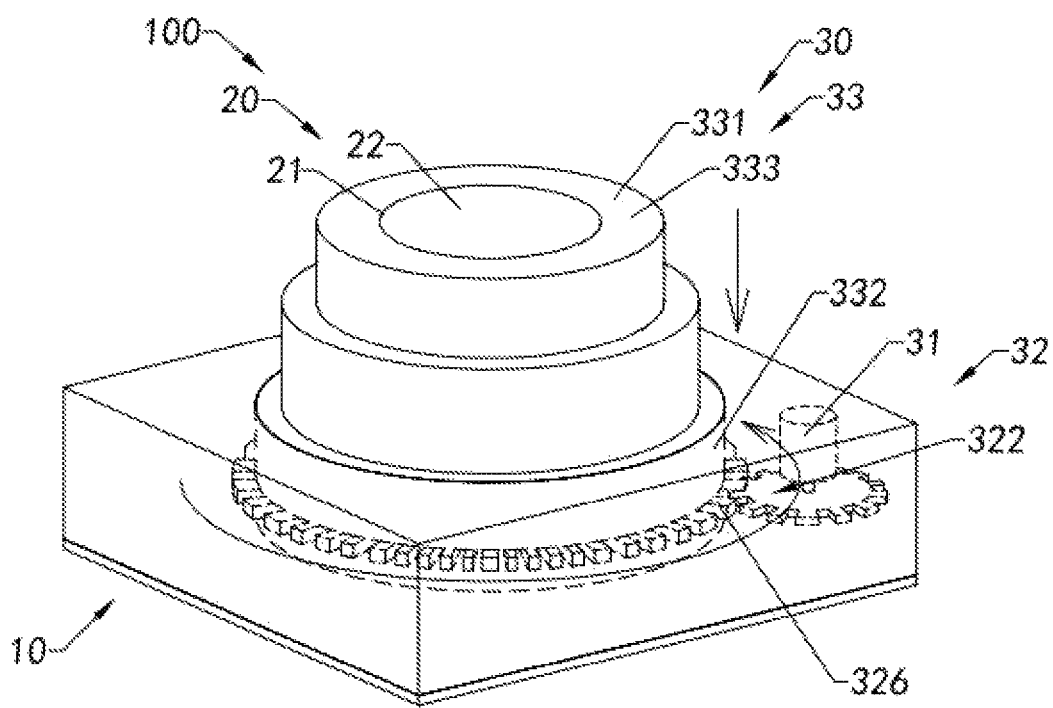
FIG. 11B is a schematic view illustrating the retractable assembly shown in FIG. 10, which is in the non-working state.

When the retractable camera module 100 is in a non-working state, the first driving element 31 generates a driving force opposite to the first direction to act on the lower end 332 of the retractable sleeve assembly 33 through the gear transmission mechanism 326. Correspondingly, under the action of the driving force, the outermost sleeve unit 333 of the retractable sleeve assembly 33 rotates in a direction opposite to the first direction to drive the inner sleeve unit 333 to move helically and downwardly, so as to drive the lens 20 to move close to the photosensitive chip 12, reduce the distance between the lens 20 and the photosensitive chip 12, and achieve the purpose of reducing the overall height dimension of the retractable camera module 100, as shown in FIG. 11B.

It is worth mentioning that, in the specific example, due to the small structural size of the gear transmission mechanism 326, the diameter of the lower end 332 of the corresponding retractable sleeve assembly 33 is relatively large, which may cause a transmission ratio of greater than 1, that is, the rotation speed of the retractable sleeve assembly 33 is relatively slow, which affects the working efficiency of the retractable camera module 100.

In view of the above efficiency problem, in some variant implementations of the specific example, the transmission mechanism 32 can be adjusted to a gear 325 and a worm structure, that is, the first driving element 31 drives the gear 325 to rotate, and the gear 325 drives the worm to move, the worm acts on the lens 20 or the upper end 331 of the retractable sleeve assembly 33, and the working efficiency is improved through such a transmission mechanism 32.

To sum up, the retractable assembly 30 based on the specific example of the present invention is illustrated, which realizes the purpose of switching the retractable camera module 100 between its working state and non-working state through the cooperation of the first driving element 31, the gear 325, the transmission member 33 and the guiding rail 330B provided at the retractable sleeve assembly 33.

Exemplary Retractable Assembly 4

Figure 12:
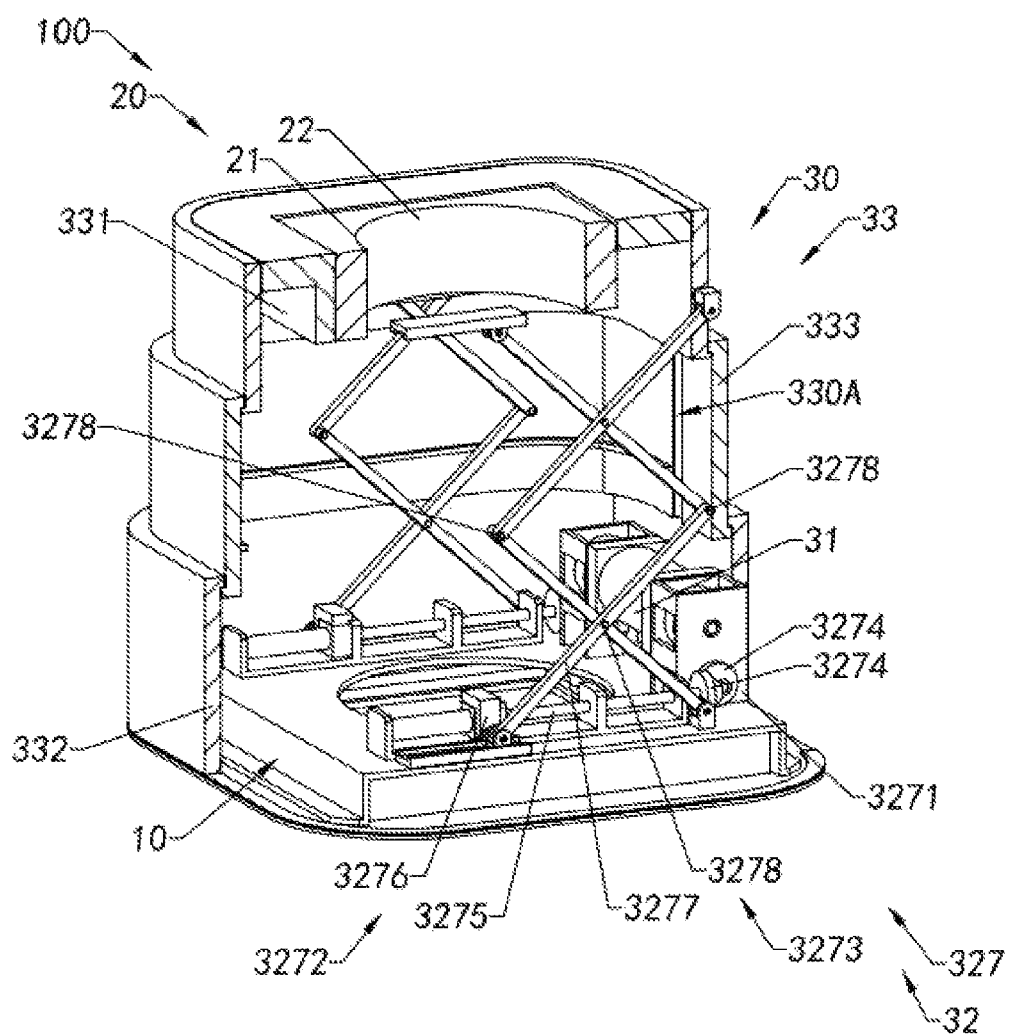
FIG. 12 is a schematic view illustrating another specific example of the retractable assembly of the retractable camera module according to the embodiment of the present invention.

FIG. 12 is a schematic perspective view illustrating another specific example of the retractable assembly 30 of the retractable camera module 100 according to another embodiment of the present invention. As shown in FIG. 12, in the specific example, the retractable assembly 30 comprises: a first driving element 31 and a transmission mechanism 32.

As shown in FIG. 12, in the specific example, the transmission mechanism 32 is a telescoping device 327, and the telescoping device 327 is arranged on the installation base plate of the photosensitive assembly 10, wherein one end of the retractable assembly 30 is connected to the retractable sleeve assembly 33 (e.g., the upper end 331 of the retractable sleeve assembly 33). Under the action of the first driving element 31, the telescoping device 327 will perform a telescopic motion to drive the retractable sleeve assembly 33 to perform a telescopic motion, so as to achieve a technical purpose of increasing or reducing the distance between the lens 20 and the photosensitive chip 12.

As shown in FIG. 12, in the specific example, the telescoping device 327 comprises a base 3271 mounted on the installation base plate of the photosensitive assembly 10, and the first driving element 31 is mounted on the base 3271. Further, the telescoping device 327 further comprises a transmission assembly 3272 and a telescoping element 3273, wherein the transmission assembly 3272 is used to transmit the driving force generated by the first driving element 31 to the telescoping element 3273, and one end of the telescoping element 3273 is coupled to the transmission assembly 3272 to receive the driving force from the transmission assembly 3272, and the telescoping element 3273 is used to drive the retractable sleeve assembly 33 to stretch or retract.

Specifically, as shown in FIG. 12, in the specific example, the transmission assembly 3272 comprises transmission elements, such as a gear assembly 3274, a screw rod 3275 and a sliding block 3276, wherein the gear assembly 3274 is connected to the take-off end of the first driving element 31 to transmit and steer the force generated by the first driving element 31, the screw rod 3275 is mounted on the base 3271 and connected to the gear assembly 3274, the sliding block 3276 is sleeved on the screw rod 3275, and one end of the telescoping element 3273 is connected to the sliding block 3276. Through such a structural configuration, when the first driving element 31 is started to work, the first driving element 31 can transmit the force generated by the first driving element 31 to the telescoping element 3273 through the gear assembly 3274, the screw rod 3275 and the sliding block 3276, so as to drive the telescoping element 3273 to stretch or retract to drive the retractable sleeve assembly 33 to stretch or retract, in order to achieve the purpose of adjusting the distance between the lens 20 and the photosensitive chip 12.

Correspondingly, as shown in FIG. 12, in the specific example, the telescoping element 3273 comprises a plurality of connecting rods 3277 hinged with each other, wherein the plurality of connecting rods 3277 are hinged with each other to form a plurality of hinge points 3278, wherein the uppermost connecting rod 3277 is fixed to the upper end 331 of the retractable sleeve assembly 33, and the lowermost connecting rod 3277 is fixed at the sliding block 3276.

Figure 13A:
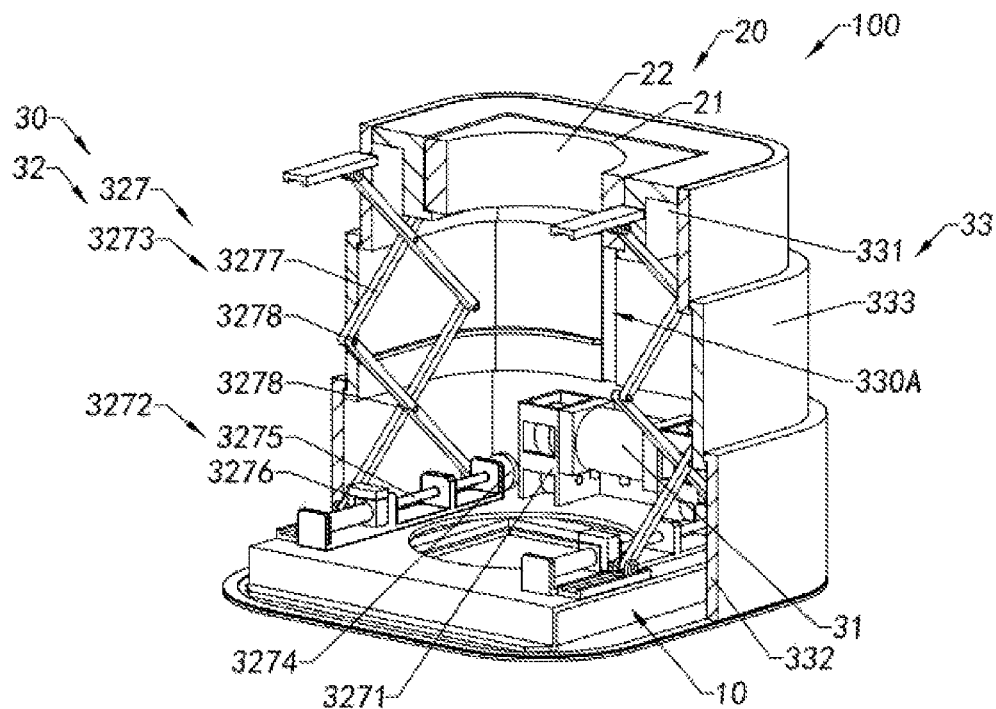
FIG. 13A is a schematic view illustrating the retractable assembly shown in FIG. 12, which is in the working state.

Correspondingly, when in the working state, the first driving element 31 generates a driving force in a first direction, and the driving force is transmitted through the transmission assembly 3272 and drives the sliding block 3276 to slide in the first direction, wherein the sliding block 3276 can drive the plurality of connecting rods 3277 of the telescoping element 3273 to pivot, so as to drive the retractable sleeve assembly 33 to stretch upwardly, so that the distance between the lens 20 and the photosensitive chips 12 is increased to meet the shooting requirements, as shown in FIG. 13A.

Figure 13B:
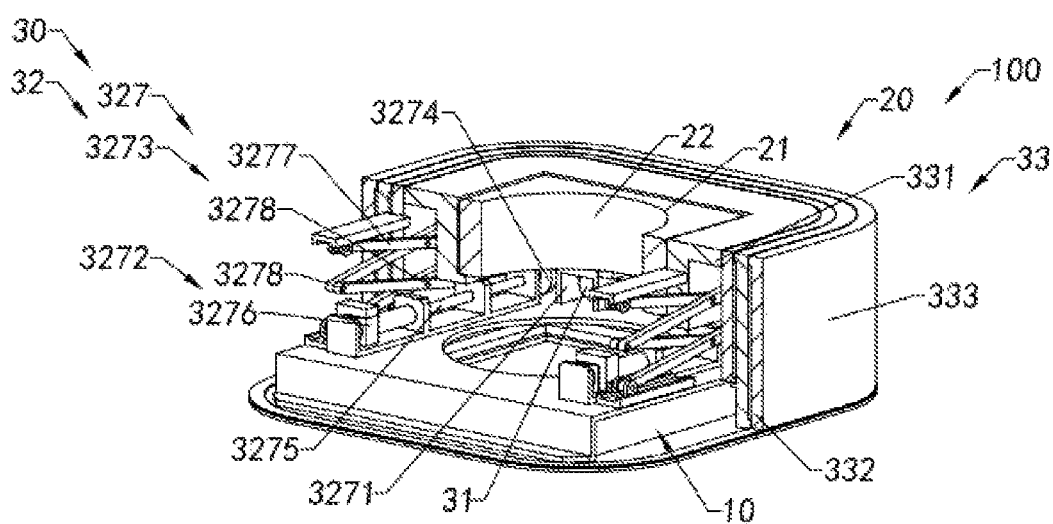
FIG. 13B is a schematic view illustrating the retractable assembly shown in FIG. 12, which is in the non-working state.

When in the non-working state, a driving force opposite to the first direction is generated, and the driving force is transmitted through the transmission assembly 3272 and drives the sliding block 3276 to slide in a direction opposite to the first direction, wherein the sliding block 3276 can drive the plurality of connecting rods 3277 of the telescoping member 3273 to pivot, so as to drive the retractable sleeve assembly 33 and the lens 20 to retract downwardly, so that the overall height dimension of the retractable camera module is reduced, as shown in FIG. 13B.

Preferably, in the specific example, the number of the plurality of hinge points 3278 of the telescoping element 3273 is consistent with the number of the sleeve units 333 of the retractable sleeve assembly 33. More preferably, the plurality of hinge points 3278 are respectively connected to the respective corresponding sleeve units 333. Taking the telescoping member 3273 including three hinge points 3278 and the retractable sleeve assembly 33 including three sleeve units 333 as an example, wherein the three hinge points 3278 are respectively fixed to the retractable sleeve units 333 of the retractable sleeve assembly 33.

To sum up, the retractable assembly 30 based on the specific example of the present invention is illustrated, which realizes the purpose of switching the retractable camera module 100 between its working state and non-working state through the cooperation of the first driving element 31 and the retractable assembly 30.

Specific Embodiment

Figure 14A:
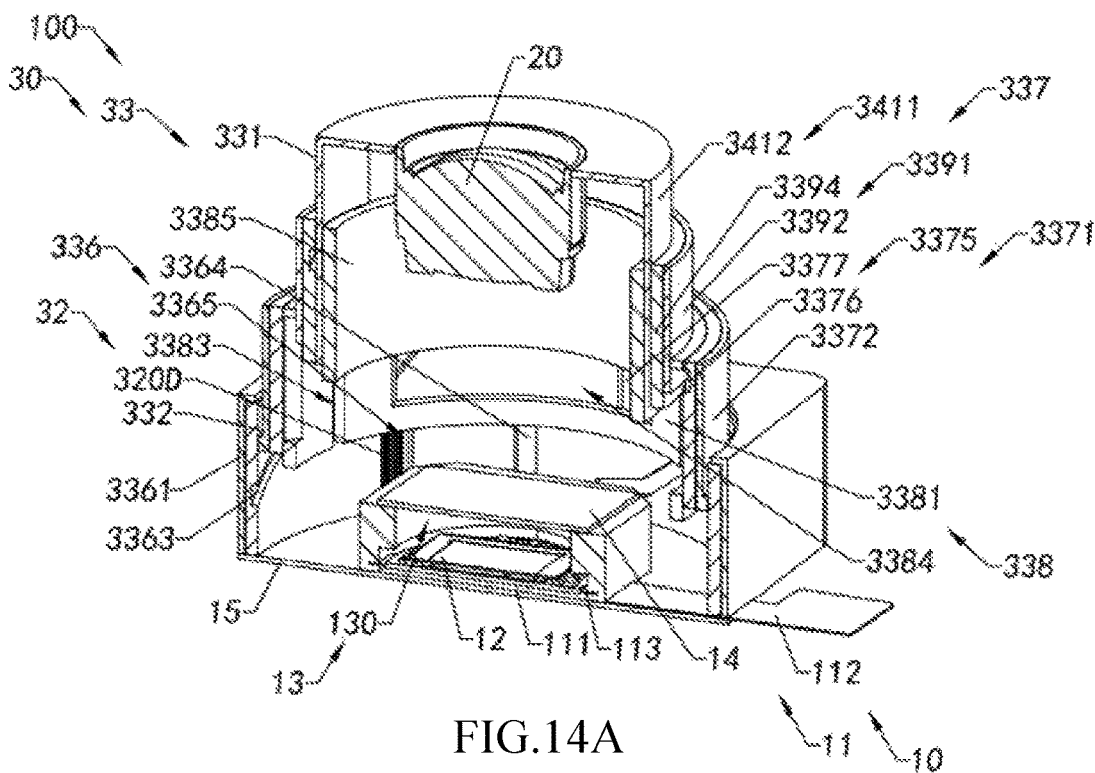
FIG. 14A is a schematic three-dimensional cross-sectional view illustrating another specific example of the retractable camera module according to the embodiment of the present invention.
Figure 14B:
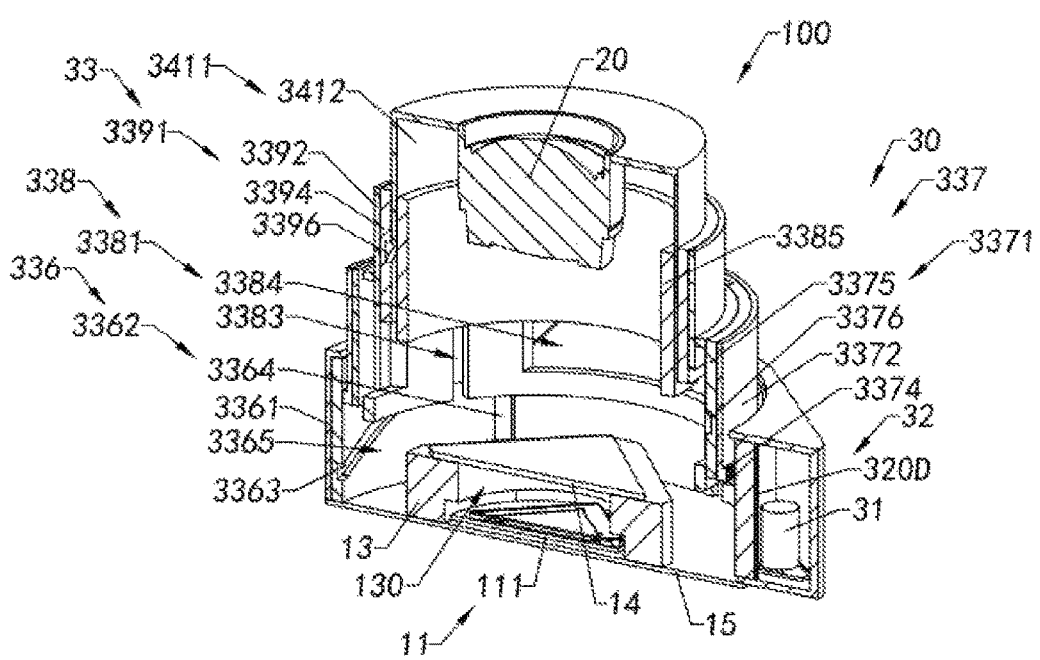
FIG. 14B is a schematic three-dimensional cross-sectional view illustrating another specific example of the retractable camera module according to the embodiment of the present invention.

FIG. 14A is a schematic three-dimensional cross-sectional view illustrating another specific example of the retractable camera module according to the embodiment of the present invention. FIG. 14B is a schematic three-dimensional cross-sectional view illustrating another specific example of the retractable camera module according to the embodiment of the present invention. As shown in FIGS. 14A and 14B, in the specific example, the retractable camera module 100 comprises: a photosensitive assembly 10, a lens 20 held on a photosensitive path of the photosensitive assembly 10, and the retractable assembly 30 is configured to adjust the relative positional relationship between the lens 20 and the photosensitive assembly 10.

As shown in FIGS. 14A and 14B, in the specific example, the photosensitive assembly 10 comprises: a circuit board 11, a photosensitive chip 12, a bracket 13 and a light filter 14, wherein the photosensitive chip 12 is electrically connected to the circuit board 11 (for example, the photosensitive chip 12 is electrically connected to the circuit board 11 through wires), so that control circuits and power required for the photosensitive chip 12 is provided through the circuit board 11. The bracket 13 is disposed on the circuit board 11 to support other components, wherein the bracket 13 has a light window 130 corresponding to at least one photosensitive area of the photosensitive chip 12. For example, in some specific examples of the present invention, the light filter 14 can be mounted on the bracket 13, so that the light filter 14 is held in a photosensitive path of the photosensitive chip 12, thus, during the process of ambient light passing through the light filter 14 to reach the photosensitive chip 12, the stray light in the ambient light can be filtered by the light filter 14 to improve imaging quality. In the specific example, the bracket 13 is implemented as a molded bracket, which is integrally formed with the circuit board 11 to cover at least a part of the circuit board 11.

In order to increase the strength of the bottom of the photosensitive assembly 10, in the specific example, the photosensitive assembly 10 further comprises a bottom plate 15 disposed on a bottom surface of the circuit board 11, for example, a steel plate is provided on the bottom surface (i.e., the bottom plate is a steel plate), so that the strength of the circuit board 11 is reinforced by the steel plate. In the specific example, the size of the bottom plate 15 may be larger than that of the circuit board 11, so as to be stacked on the back of the circuit board 11, the bottom plate 15 protrudes from a side portion of the circuit board 11, wherein the area where the bottom plate 15 protrudes from the circuit board 11 forms a new installation base plate.

As shown in FIGS. 14A and 14B, in the embodiment of the present invention, the retractable assembly 30 comprises: a first driving element 31, a transmission mechanism 32 and a retractable sleeve assembly 33, wherein the first driving element 31, the transmission mechanism 32 and the retractable sleeve assembly 33 cooperate to realize the adjustment of the relative positional relationship between the lens 20 and the photosensitive assembly 10.

In the specific example, the retractable sleeve assembly 33 is disposed at the bottom plate 15, wherein the lens 20 is held within the retractable sleeve assembly 33. In particular, in the specific example, the retractable sleeve assembly 33 has a lower end 332 and an upper end 331 opposite to the lower end 332, and the lens 20 is mounted the upper end 331 of the retractable sleeve assembly 33. Correspondingly, the first driving element 31 is configured to drive the retractable sleeve assembly 33 to stretch or retract relative to the photosensitive chip 12 along the photosensitive path. Therefore, in the specific example, the lens 20 can be stretched or retracted relative to the photosensitive chip 12 to be switched between the working state and the non-working state through the first driving element 31 and the retractable sleeve assembly 33, wherein, when in the working state, the retractable sleeve assembly 33 is driven to stretch upwardly relative to the photosensitive chip 12 to drive the lens 20 to move upwardly relative to the photosensitive chip 12, so as to increase the distance between the lens 20 and the photosensitive chip 12; when in a non-working state, the retractable sleeve assembly 33 is driven to retract downwardly relative to the photosensitive chip 12 to drive the lens 20 to move downwardly relative to the photosensitive chip 12, so as to reduce the distance between the lens 20 and the photosensitive chip 12.

Figure 15:
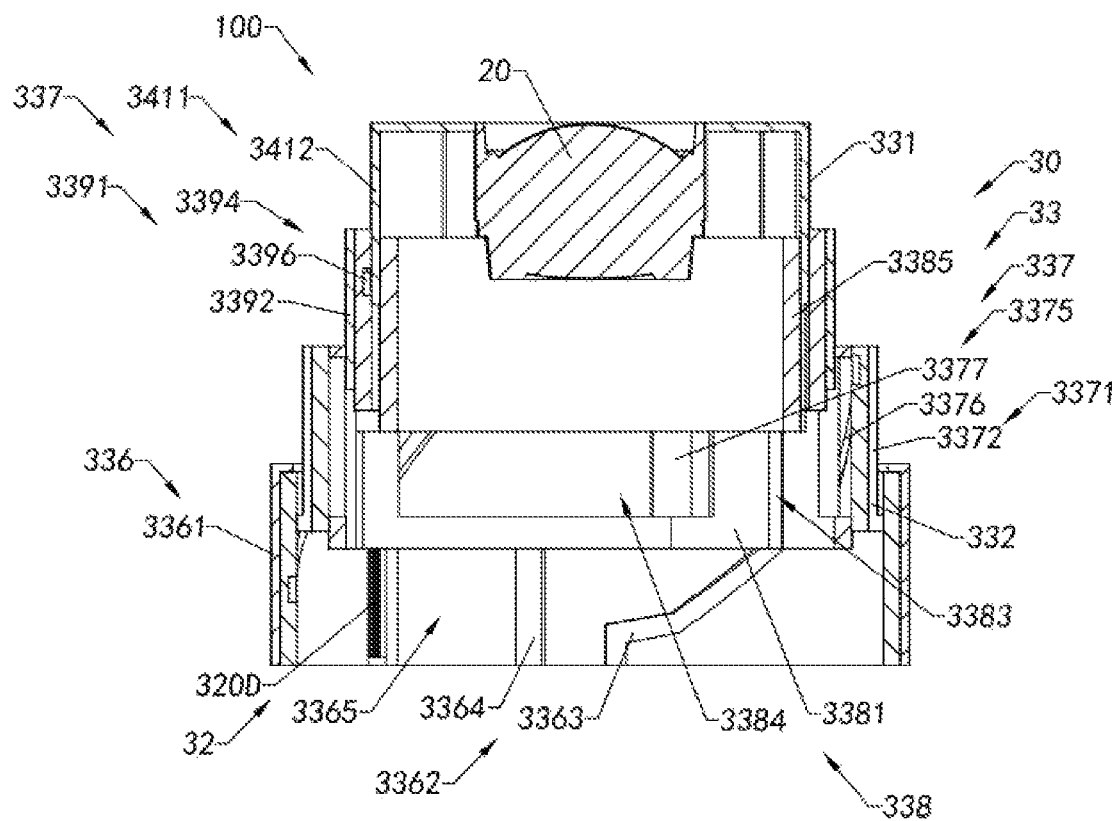
FIG. 15 is another schematic cross-sectional view illustrating the retractable sleeve assembly of the retractable camera module according to the embodiment of the present invention.
Figure 16:
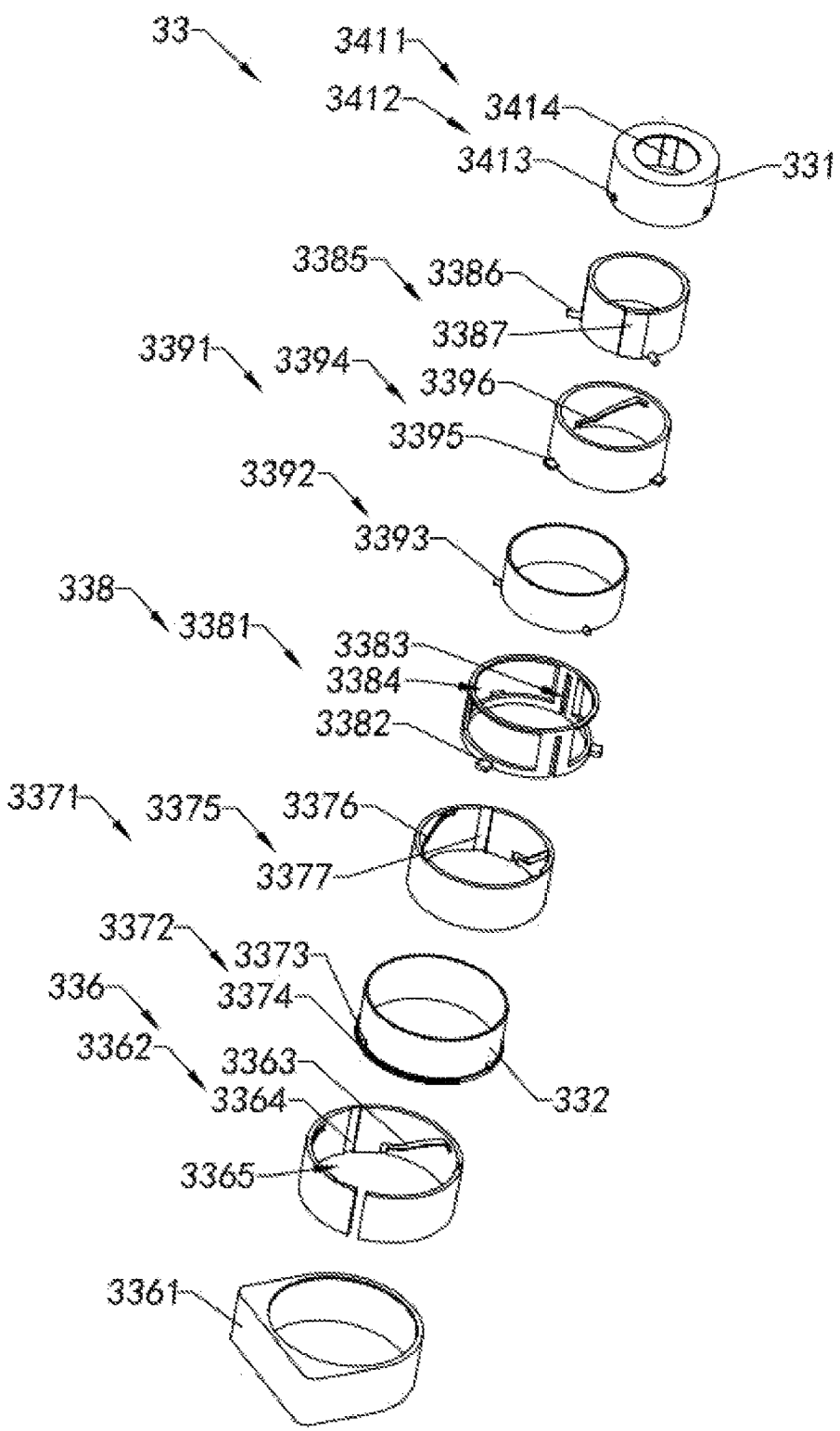
FIG. 16 is a schematic exploded view illustrating the retractable sleeve assembly of the retractable camera module according to the embodiment of the present invention.

As shown in FIG. 15 and FIG. 16, in the specific example, the retractable sleeve assembly 33 comprises: a fixing portion 336 disposed on the bottom plate 15; a plurality of movable members 337 embedded in the fixing portion 336 and nested with each other; and at least one supporting frame 338 disposed between every two adjacent movable members 337 to strengthen structurally the corresponding movable members 337 by the supporting frame 338. In particular, in the specific example, the fixing portion 336 forms the lower end 332 of the retractable sleeve assembly 33, and the movable member of the plurality of movable members 337 located at an innermost layer forms the upper end 331 of the retractable sleeve assembly 33, that is, in the specific example, the lens 20 is held on the movable member 337 located at the innermost layer.

As shown in FIGS. 14A, 14B, 15 and 16, in the specific example, the fixing portion 336 comprises a casing 3361 disposed on the bottom plate 15 and a first sleeve 3362 embedded in the casing 3361, wherein the first sleeve 3362 has a first helical guiding rail 3363 concavely formed on an inner surface thereof, and a first guiding groove 3364 concavely formed on the inner surface thereof and extended vertically. As shown in FIGS. 14A, 14B, 15 and 16, the plurality of movable members 337 comprise a first movable member 3371 embedded in the fixing portion 336, wherein the first driving element 31 is configured to act on the first movable member 3371, to make the first movable member 3371 move up or down helically along the first helical guiding rail 3363.

More specifically, the first movable member 3371 comprises a second sleeve 3372 drivably connected to the first driving element 31, wherein the second sleeve 3372 has a first guide head 3373 protrudingly formed on an outer surface thereof, wherein when the second sleeve 3372 is embedded in the first sleeve 3362, the first guiding head 3373 is engaged in the first helical guiding rail 3363, so that when the second sleeve is driven by the first driving element 31, the second sleeve 3372 is drive to move up or down helically along the first helical guiding rail 3363.

In the specific example, as shown in FIGS. 14A, 14B, 15 and 16, the second sleeve 3372 has an annular rack 3374 formed on an outer surface thereof, and the first sleeve 3362 also has a receiving groove 3365, the retractable assembly 30 further comprises a gear column 320D disposed in the receiving groove 3365, the gear column 320D is engaged with the annular rack 3374 of the second sleeve 3372, wherein the force provided by the first driving element 31 is acted on the gear column 320D to be transmitted to the second sleeve 3372 through the gear column 320D as the transmission mechanism 32. In the specific example, the first drive element 31 can be implemented as a stepping motor.

Further, as shown in FIGS. 14A, 14B, 15 and 16, in the specific example, the first movable member 3371 further comprises a third sleeve 3375 embedded in the second sleeve 3372, wherein the third sleeve 3375 has a second helical guiding rail 3376 concavely formed on an inner surface of third sleeve 3375, and a second guiding groove 3377 concavely formed on the inner surface and extended vertically.

In particular, in the specific example, the casing 3361 is made of metal material, and the first sleeve 3362 is made of plastic material. That is, the casing 3361 is a metal casing 3361, and the first sleeve 3362 is a plastic sleeve. Here, when the casing 3361 is implemented as a metal casing 3361, the metal casing 3361 forms a signal shield, which is beneficial to prevent external noise from interfering with imaging. In addition, the first sleeve 3362 embedded in the metal casing 3361 can strengthen the structural strength of the metal casing 3361. Also, when the first sleeve 3362 is implemented as a plastic sleeve, it can reduce the overall weight of the retractable sleeve assembly 33. Of course, in other examples of the present invention, the casing 3361 and the first sleeve 3362 may also be made of other materials, wherein the casing 3361 and the first sleeve 3362 may be made of the same material, and they may also be inconsistent, which is not limited by the present invention.

In particular, in the specific example, the second sleeve 3372 is made of a metal material, and the third sleeve 3375 is made of a plastic material. That is, the second sleeve 3372 is a metal sleeve, and the third sleeve 3375 is a plastic sleeve. Here, when the second sleeve 3372 is implemented as a metal sleeve, during the retractable camera module 100 is in the working state, the second sleeve 3372 is exposed to the outside, therefore, the second sleeve 3372 made of metal material can prolong its life, and the second sleeve 3372 made of metal material has relatively greater strength. Correspondingly, the third sleeve 3375 embedded in the second sleeve 3372 can strengthen the structural strength of the second sleeve 3372, and when the third sleeve 3375 is implemented as a plastic sleeve, which can reduce the overall weight of the first movable member 3371. Moreover, when the third sleeve 3375 is made of plastic material, it is more convenient to process the second helical guiding rail 3376 on its inner surface.

Of course, in other examples of the present invention, the second sleeve 3372 and the third sleeve 3375 may also be made of other materials, wherein the casing 3361 and the first sleeve 3362 may be made of the same material, they may also be inconsistent, which is not limited by the present invention.

Further, as shown in FIGS. 14A, 14B, 15 and 16, in the specific example, the at least one supporting frame 338 comprises a first supporting frame 3381 embedded in the third sleeve 3375, the first supporting frame 3381 has a second guiding head 3382 formed at the lower end 332 thereof, wherein when the first supporting frame 3381 is embedded in the first sleeve 3362, the second guiding head 3382 is engaged in the first guiding groove 3364 of the first sleeve 3362, so that when the first supporting frame 3381 moved up or down along with the first movable member 3371, the first supporting frame 3381 can vertically move up or down along the first guiding groove 3364.

Here, when the first supporting frame 3381 moves up or down synchronously along the first guiding groove 3364 along with the first movable member 3371, the first supporting frame 3381 embedded in the first movable member 3371 can provide sufficient support strength for the first movable member 3371 to ensure the stability of the retractable sleeve assembly 33 during the stretching or retracting process.

Further, as shown in FIGS. 14A, 14B, 15 and 16, in the specific example, the first supporting frame 3381 has a third guiding groove 3383 formed through a side surface thereof and extended vertically, and a moving space formed through the side surface thereof. As shown in FIG. 16, the third guiding groove 3383 is formed through the inner and outer sides of the first supporting frame 3381, and in the specific example, the third guiding groove 3383 has a U-shaped structure. As shown in FIG. 16, the moving space 3384 is extended through the inner side and outer sides of the first supporting frame 3381. Specifically, in the specific example, the moving space 3384 is formed and surround by an upper edge and a lower surface of the first supporting frame 3381 and an inner side wall of the supporting frame 338.

Further, as shown in FIGS. 14A, 14B, 15 and 16, in the specific example, the plurality of movable members 337 further comprise a second movable member 3391, and the second movable member 3391 comprises a fourth sleeves 3392, wherein the fourth sleeve 3392 has a third guide head 3393 protrudingly formed on an outer surface thereof, the fourth sleeve 3392 is embedded in the first supporting frame 3381, and the third guiding head 3393 passes through the third guiding groove 3383 and is engaged in the second helical guiding rail 3376 of the third sleeve 3375, wherein when the third sleeve 3375 is driven to move up or down helically, the fourth sleeve 3392 is driven to move up or down vertically along the second helical guiding rail 3376 under the action of the third guiding groove 3383.

Further, as shown in FIGS. 14A, 14B, 15 and 16, in the specific example, the second movable member 3391 further comprises a fifth sleeve 3394 having a fourth guide head 3395 protrudingly formed on an outer surface thereof and a third helical guiding rail 3396 concavely formed on an inner surface thereof, wherein the fifth sleeve 3394 is embedded in the fourth sleeve 3392 and the fourth guiding head 3395 is movably supported in the moving space 3384 of the first supporting frame 3381, wherein when the first supporting frame 3381 is driven to move up or down vertically, the fifth sleeve 3394 is driven by the first supporting frame 3381 to move up or down helically.

In particular, in the specific example, the fourth sleeve 3392 is made of metal material, and the fifth sleeve 3394 is made of plastic material. That is, the fourth sleeve 3392 is a metal sleeve, and the fifth sleeve 3394 is a plastic sleeve. Here, when the fourth sleeve 3392 is implemented as a metal sleeve, during the retractable camera module 100 is in the working state, the fourth sleeve 3392 is exposed to the outside, therefore, the fourth sleeve 3392 made of metal material can prolong its life, and the fourth sleeve 3392 made of metal material has relatively greater strength. Correspondingly, the fifth sleeve 3394 embedded in the fourth sleeve 3392 can strengthen the structural strength of the fourth sleeve 3392, and when the fifth sleeve 3394 is implemented as a plastic sleeve, which can reduce the overall weight of the second movable member 3391. Moreover, when the fifth sleeve 3394 is made of plastic material, it is more convenient to process the third helical guiding rail 3396 on its inner surface.

Of course, in other examples of the present invention, the second sleeve 3372 and the third sleeve 3375 may also be made of other materials, wherein the casing 3361 and the first sleeve 3362 may be made of the same material, they may also be inconsistent, which is not limited by the present invention.

Further, as shown in FIGS. 14A, 14B, 15 and 16, in the specific example, the at least one supporting frame 338 comprises a second supporting frame 3385 embedded in the fifth sleeve 3394, wherein the second supporting frame 3385 has a fifth guiding head 3386 protrudingly formed on the outer surface thereof, wherein when the second supporting frame 3385 is embedded in the fifth sleeve 3394, the fourth guiding head 3395 is movably engaged in the third guiding groove 3383 of the first supporting frame 3381. Correspondingly, when the fifth sleeve 3394 is driven by the first supporting frame 3381 to move up or down helically, the second supporting frame 3385 is driven by the fifth sleeve 3394 to move up or down vertically in the third guiding groove 3383.

It should be understood that when the second supporting frame 3385 is driven by the fifth sleeve 3394 to move up or down vertically under the action of the third guiding groove 3383, the second supporting frame 3385 embedded in the second movable member 3391 can provide sufficient supporting strength for the second movable member 3391 to ensure the stability of the retractable sleeve assembly 33 during the stretching or retracting process.

Further, as shown in FIGS. 14A, 14B, 15 and 16, in the specific example, the second supporting frame 3385 has a guiding portion 3387 extended vertically and formed protrudingly on an outer surface thereof. The third movable member 3411 comprises a sixth sleeve 3412 embedded between the second supporting frame 3385 and the fifth sleeve 3394, and the sixth sleeve 3412 has a sixth guiding head 3413 protrudingly formed on an outer surface thereof and a guiding slot 3414 concavely formed on an inner surface thereof and extended vertically, wherein when the sixth sleeve 3412 is embedded in the second supporting frame 3385 and the fifth sleeve 3394, the sixth guiding head 3413 is engaged in the third helical guiding rail 3396 of the fifth sleeve 3394 and the guiding groove 3414 is embedded in the guiding portion 3387. Correspondingly, when the fifth sleeve 3394 is driven by the first supporting frame 3381 to move up or down helically, the sixth sleeve 3412 is driven to move up or down helically along the third helical guiding rail 3396 under the action of the guiding portion 3387 and the guiding slot 3414.

Preferably, in the specific example, the sixth sleeve 3412 is made of metal material. Of course, in other examples of the present invention, the sixth sleeve 3412 can also be made of other materials, for example, plastic materials. It is worth mentioning that, in the specific example, the sixth sleeve 3412 forms the upper end 331 of the retractable sleeve assembly 33 when in the working state.

It is also worth mentioning that although the abovementioned retractable sleeve assembly 33 comprises a fixing portion 336, three movable members 337 and two supporting frames 338 as an example, those skilled in the art should understand that in the other specific implementations, the retractable sleeve assembly 33 may further comprise a larger number of movable members 337 and a larger number of supporting frames 338, which is not limited by the present invention.

As mentioned above, in the specific example, the first driving element 31 is implemented as a stepping motor, and the transmission mechanism 32 is implemented as a gear column 320D to driven the first movable member 3371 of the retractable sleeve assembly 33 by the cooperation between the stepping motor and the gear column 320D. However, in a specific implementation, since the structure of the stepping motor and the gear column 320D is relatively large, installing them inside the retractable sleeve assembly 33 may cause the overall size of the retractable camera module 100 is too large, which cannot meet the current trend of miniaturization of module structure. Moreover, since the efficiency of driving the retractable sleeve assembly 33 is low when the stepping motor is working, there may also be a sound of the motor working. Therefore, in other specific embodiments of the specific implementation, the first driving element 31 may also adopt a ring-shaped ultrasonic motor.

Specifically, the annular ultrasonic motor comprises a stator 51 and a mover 52, wherein the stator 51 is made by connecting a ring-shaped piezoelectric ceramic sheet to a ring-shaped metal plate, wherein the electrodes of the ring-shaped piezoelectric ceramic sheet are arranged and excited to enable the stator 51 to generate traveling waves, and the ring-shaped metal plate can be made to be comb-shaped to increase the amplitude of the waves.

It has been verified that replacing the stepping motor with the annular ultrasonic motor as the power source of the retractable sleeve assembly 33 can improve the driving efficiency and make the driving quieter.

Figure 17:
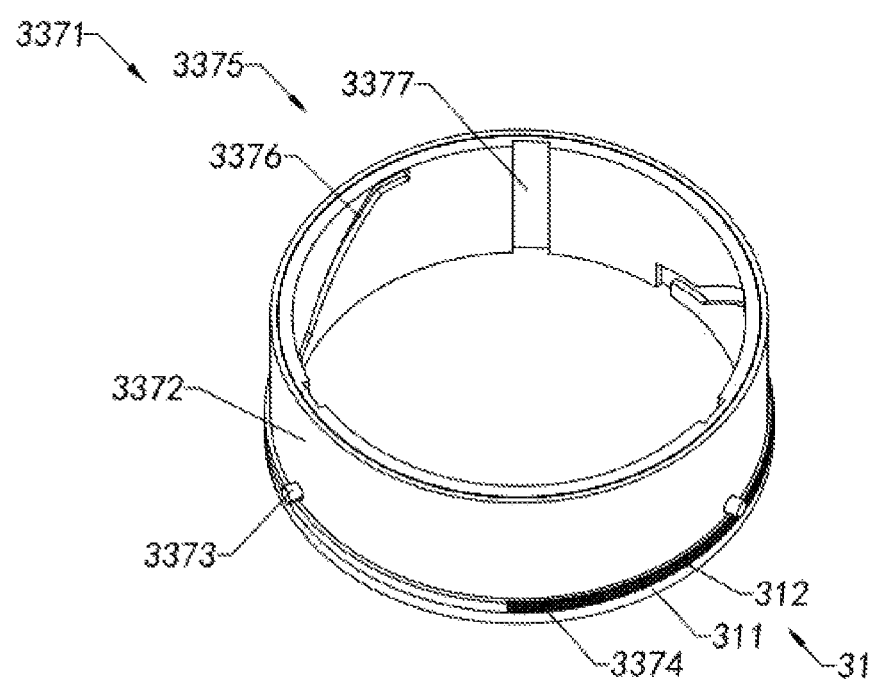
FIG. 17 is a schematic view illustrating that in the retractable camera module according to the embodiment of the present invention, a mover of a first driving element is drivably connected with the first movable member of the retractable sleeve assembly, wherein the first driving element is an annular ultrasonic motor.

Specifically, as shown in FIG. 17, in the specific example, a bottom of the second sleeve 3372 is installed on the mover 52 of the annular ultrasonic motor, wherein the stator 51 of the annular ultrasonic motor is installed on the bottom plate 15. Correspondingly, after the annular ultrasonic motor is supplied with electric current, the mover 52 of the annular ultrasonic motor can be rotated to drive the first movable member of the retractable sleeve assembly 33 connected with the mover 52 (more specifically 2, the second sleeve 3372 of the first movable member 3371). In particular, in the specific example, the annular ultrasonic motor is provided with a reinforcing structure on an outer side of the stator 51, and more specifically, a boss is provided on the outer side of the stator 51, and the boss can be fixed to other positions of the retractable sleeve assembly 33 to improve the support strength of the stator 51 of the annular ultrasonic motor.

Figure 18:
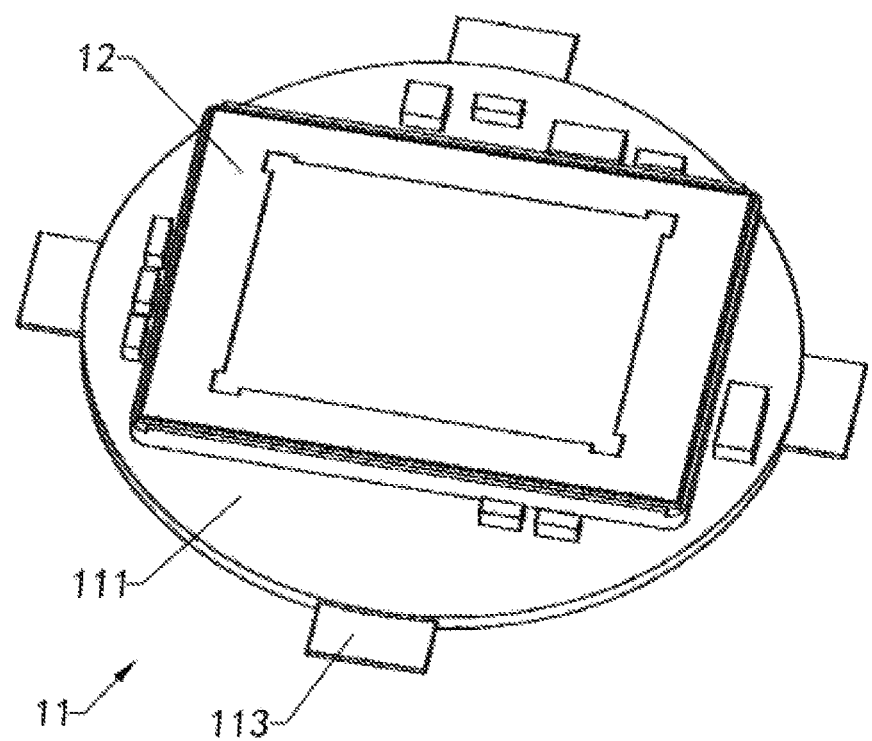
FIG. 18 is a schematic view illustrating a photosensitive assembly of the retractable camera module according to the embodiment of the present invention.
Figure 19:
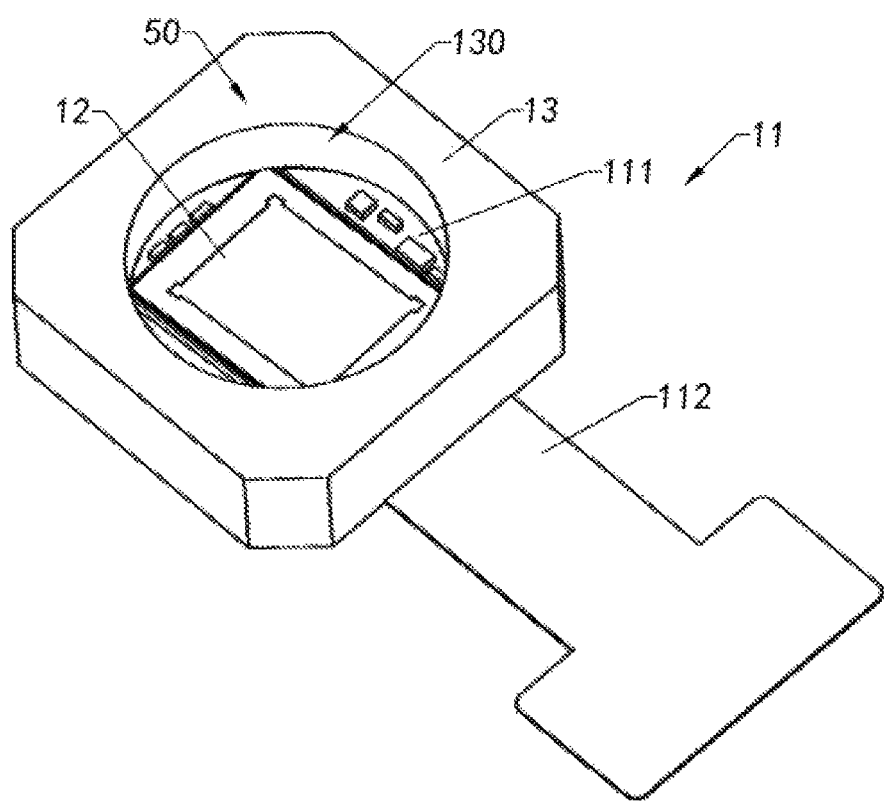
FIG. 19 is a schematic diagram illustrating the cooperation of the photosensitive assembly and the second driving element of the retractable camera module according to the embodiment of the present invention.

Further, as shown in FIGS. 18 and 19, in the specific example, the circuit board 11 has a circular circuit board body 111 and a flexible board connection board 112 electrically connected to the circuit board body 111, and the circuit board 11 further comprises terminals 113 formed at a periphery edge of the circuit board 11. As shown in FIGS. 18 and 19, in the specific example, the retractable camera module 100 further comprises a second driving element 50 for driving the photosensitive assembly 10 to perform optical focusing and/or optical image stabilization.

In the specific example, the pins of the second driving element 50 are electrically connected to the terminal 113, so as to provide the second driving element 50 with electrical energy required for operation through the circuit board 11. As shown in FIG. 19, in the specific example, the second driving element 50 comprises a fixing portion 336 and a driving portion, wherein the photosensitive assembly 10 is disposed on the driving portion. Here, the driving part has an annular installation cavity, so in the specific implementation, the circuit board body 111 is implemented as an annular structure, so that the shape of the circuit board 11 is matched with the installation cavity of the driving portion.

Correspondingly, after the second driving element 50 is turned on, the driving portion can carry the photosensitive assembly 10 to move along the photosensitive path defined by the photosensitive assembly 10 to optical focus, and/or, to adjust posture of the photosensitive assembly in the plane defined by the photosensitive assembly 10 to achieve optical image stabilization.

It is worth mentioning that, in the specific example, since the second driving element 50 only needs to drive the photosensitive assembly 10 to move, the required driving force is small, that is, the second driving element 50 can be miniaturized. In a specific implementation, the second driving element 50 may be a ball motor, a SMA motor, or an ultrasonic motor, the specific selection of which is not limited by the present invention.

Further, as shown in FIG. 14A, in the specific implementation, the casing 3361 of the retractable sleeve assembly 33 is provided with an installation space for installing the flexible board connection board 112, that is, an installation gap is reserved at the corresponding position of in the casing 3361, for drawing out the flexible board connection board 112.

It is worth mentioning that, in the specific example, the second driving element 50 may only have a focusing function or only an optical anti-shake function, which is not limited by the present invention.

To sum up, based on the specific example of the present invention, the retractable camera module 100 is illustrated, when the retractable camera module 100 is in the working state, the retractable sleeve assembly 33 will stretch upwardly under the action of the first driving element 31, to drive the lens 20 away from the photosensitive assembly 10, so that the distance between the lens 20 and the photosensitive assembly 10 meets the telephoto shooting requirements. In addition, in order to better image the captured object, the second driving element 50 of the retractable camera module 100 can drive the photosensitive assembly 10 to change the relative positional relationship between the photosensitive assembly 10 and the lens 20 for optical focus and/or optical image stabilization. When the retractable camera module 100 is in a non-working state, the retractable sleeve assembly 33 is retracted downwardly under the action of the first driving element 31 to drive the lens 20 to retract back downwardly, so that the overall height dimension of the retractable camera module 100 is reduced.

Exemplary Electronic Device

According to another aspect of the present invention, an electronic device is also provided.

Figure 20:
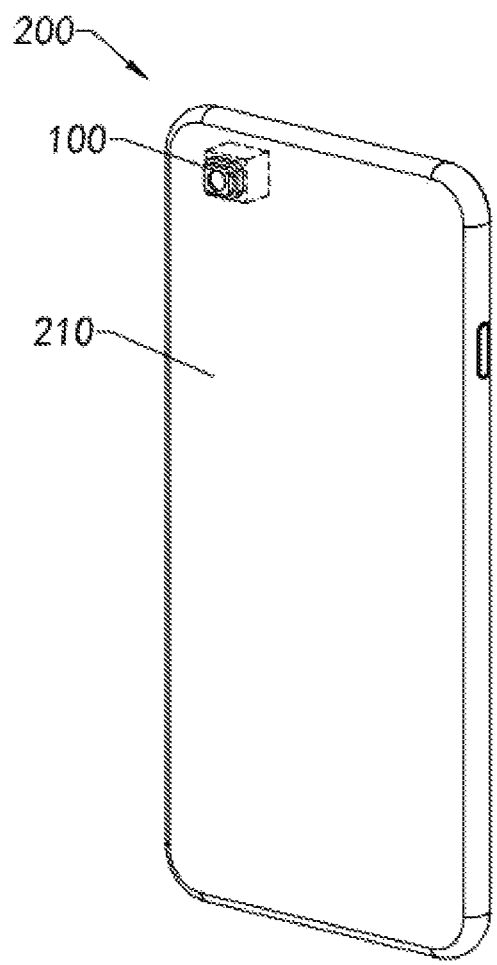
FIG. 20 is a schematic view illustrating an electronic device according to the embodiment of the present invention.

FIG. 20 is a schematic view illustrating an electronic device according to the embodiment of the present invention. As shown in FIG. 20, the electronic device 200 according to the embodiment of the present invention comprises an electronic device body 210 and the above-mentioned retractable camera module 100 assembled in the electronic device body 210. In particular, the minimum height dimension of the retractable sleeve assembly 33 is less than or equal to the thickness dimension of the electronic device 200.

In a specific implementation, the retractable camera module 100 can be deployed on the back of the electronic device body 210 to be used as a rear camera module. Of course, it can also be provided as the front part of the electronic device body 210 to be applied as a front camera module. The specific installation position of the retractable camera module 100 on the electronic device body 210 is not limited by the present invention.

In particular, compared with the conventional vertical camera module, the retractable camera module 100 can stretch its lens 20 in its working state to increase its total optical length until it meets the shooting requirements.

Figure 21:
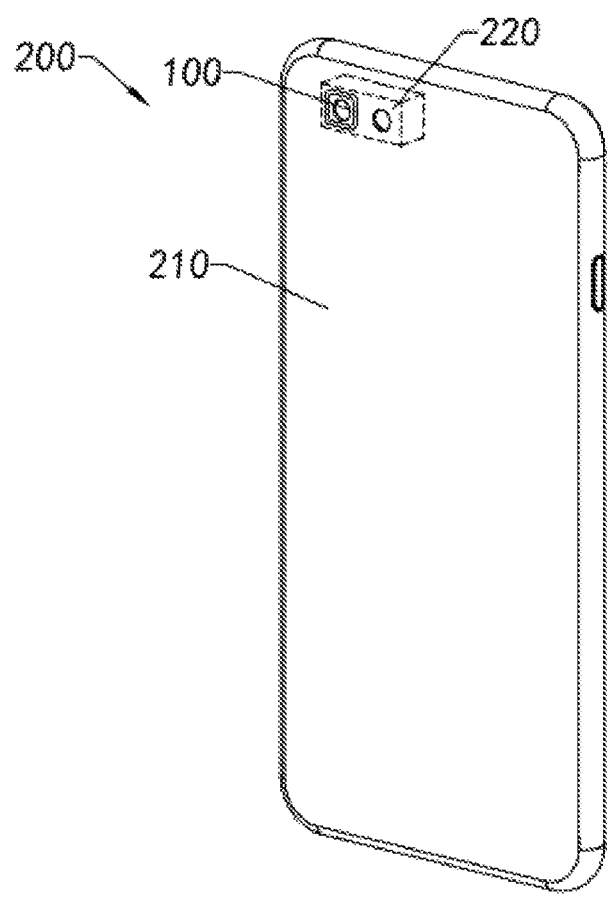
FIG. 21 is another schematic view illustrating the electronic device according to the embodiment of the present invention.

FIG. 21 is another schematic view illustrating the electronic device 200 according to the embodiment of the present invention. As shown in FIG. 21, the electronic device 200 according to the embodiment of the present invention comprises an electronic device body 210, the above-mentioned retractable camera module 100 assembled in the electronic device body 210, and the second camera module 220 assembled in the electronic device body 210. In particular, compared with the retractable camera module 100, the second camera module 220 has a relatively smaller effective focal length.

That is, in the electronic device 200 shown in FIG. 21, the electronic device 200 is configured with a plurality of camera modules, that is, the retractable camera module 100 and the existing short-focus camera module are applied together as an image sensor of the electronic device 200. During operation, the retractable camera module 100 and the second camera module 220 can cooperate with each other to provide more abundant imaging functions.

Figure 22:
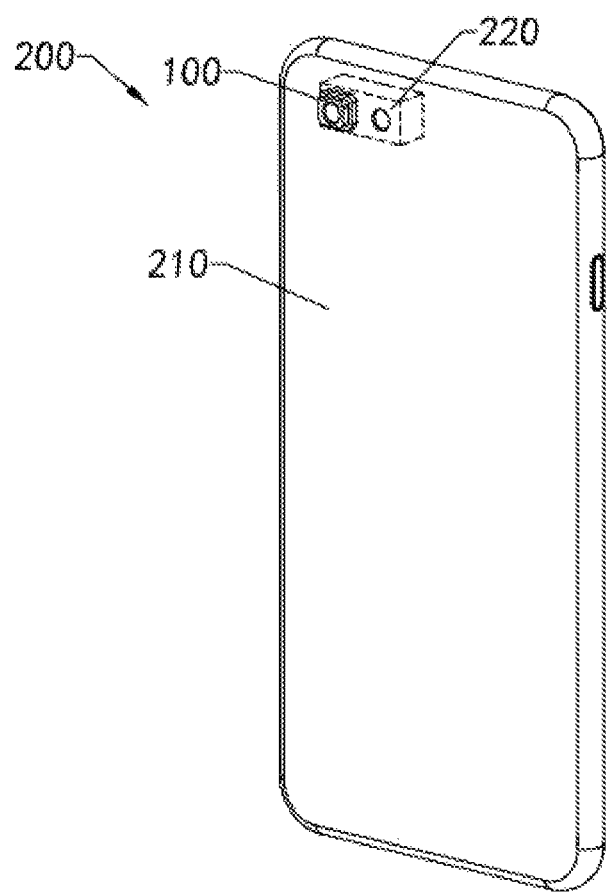
FIG. 22 is another schematic view illustrating the electronic device according to the embodiment of the present invention shown in FIG. 21.

FIG. 22 is another schematic view illustrating the electronic device 200. As shown in FIG. 15, in the working state, the retractable camera module 100 can stretch its lens 20 to increase its total optical length until it meets the shooting requirements.

Those skilled in the art should understand that the embodiments of the present invention shown in the above description and the accompanying drawings are only examples and do not limit the present invention. The objects of the present invention have been completely and effectively realized. The function and structural principle of the present invention have been shown and explained in the above embodiments. Without departing from the principle, the embodiments of the present invention can be deformed or modified.

What is claimed is:

1. A retractable camera module, comprising:
    a photosensitive assembly comprising a base plate, a circuit board supported on the base plate and a photosensitive chip electrically connected to the circuit board;
    a lens held on a photosensitive path of the photosensitive assembly; and
    a retractable assembly configured to adjust a relative positional relationship between the lens and the photosensitive chip, wherein the telescopic assembly comprise:
    a retractable sleeve assembly provided on the base plate, wherein the lens is held within the retractable sleeve assembly; and
    a first driving element, wherein the first driving element is configured to drive the retractable sleeve assembly to stretch or retract relative to the photosensitive chip along the photosensitive path;
    wherein the lens is capable of moving telescopically relative to the photosensitive chip by the first driving element and the retractable sleeve assembly to be switched between a working state and a non-working state, wherein when in the working state, the retractable sleeve assembly is driven to be stretched upwardly relative to the photosensitive chip to drive the lens to move upwardly relative to the photosensitive chip, so as to increase a distance between the lens and the photosensitive chip; when in a non-working state, the retractable sleeve assembly is driven to retract downwardly relative to the photosensitive chip to drive the lens to move downwardly relative to the photosensitive chip, so as to reduce the distance between the lens and the photosensitive chip, wherein the retractable sleeve assembly comprises:
    a fixing portion arranged on the bottom plate;
    a plurality of movable member embedded in the fixing portion and nested with each other; and
    at least one supporting frame arranged between every two adjacent movable members, so that two corresponding movable members are structurally strengthened by the supporting frame.

2. The retractable camera module according to claim 1, wherein the retractable sleeve assembly has a lower end and an upper end opposite to the lower end, and the lens is installed on the upper end of the retractable sleeve assembly.

3. The retractable camera module according to claim 2, wherein the fixing portion of the retractable sleeve assembly defines the lower end, and an innermost movable member of the plurality of movable members defines the upper end of the retractable sleeve assembly.

4. The retractable camera module according to claim 2, wherein the fixing portion comprises a casing provided on the bottom plate and a first sleeve embedded in the casing, wherein the first sleeve has a helix guiding rail concavely formed on an inner surface of the first sleeve, and a first guiding groove concavely formed on the inner surface of the first sleeve and extended vertically.

5. The retractable camera module according to claim 4, wherein the plurality of movable members comprise a first movable member embedded in the fixing portion, wherein the first driving element is configured to act on the first movable member to make the first movable member move up or down helically along the first helical guiding rail.

6. The retractable camera module according to claim 5, wherein the first movable member comprises a second sleeve drivably connected to the first driving element, wherein the second sleeve has a first guiding head protrudingly formed on an outer surface of the second sleeve, wherein when the second sleeve is embedded in the first sleeve, the first guiding head is engaged in the first helical guiding rail, so that the second sleeve is capable of being driven by the first driving element to move up or down along the first helical guiding rail helically.

7. The retractable camera module according to claim 6, wherein the fixing portion further comprises a third sleeve embedded in the second sleeve, wherein the third sleeve has a second helix guiding rail concavely formed on an inner surface of the third sleeve, and a second guiding groove concavely formed on the inner surface and extended vertically.

8. The retractable camera module according to claim 7, wherein the at least one supporting frame comprises a first supporting frame embedded in the third sleeve, wherein the first supporting frame has a second guiding head formed at a lower end of the first supporting frame, wherein when the first support frame is embedded in the first sleeve, the first guiding head is engaged in the first guide groove of the first sleeve, so that when the first support frame moves up or down along with the first movable member, the first support frame is capable of moving up or down along the first guide groove vertically.

9. The retractable camera module according to claim 8, wherein the first supporting frame has a third guiding groove formed through a side surface of the first supporting frame and extended vertically, and a moving space formed through the side surface of the first supporting frame.

10. The retractable camera module according to claim 8, wherein the plurality of movable members further comprise a second movable member, wherein the second movable member comprises a fourth sleeve, wherein the fourth sleeve has a third guiding head protrudingly formed on an outer surface of the fourth sleeve, wherein the fourth sleeve is embedded in the first supporting frame and the third guiding head passes through the third guiding groove and is engaged in the second helical guiding rail of the third sleeve, wherein when the third sleeve is driven to move up or down helically, the fourth sleeve is driven to move up or down vertically along the second helical guiding rail.

11. The retractable camera module according to claim 10, wherein the second movable member further comprises a fifth sleeve, and the fifth sleeve has a fourth guiding head protrudingly formed on an outer surface of the fifth sleeve and a third helical guiding rail concavely formed on an inner surface of the fifth sleeve, wherein the fifth sleeve is embedded in the fourth sleeve and the fourth guiding head is movably supported in the moving space of the first supporting frame, wherein when the first supporting frame is driven to move up or down vertically, the fifth sleeve is driven by the first supporting frame to move up or down helically.

12. The retractable camera module according to claim 11, wherein the at least one supporting frame comprises a second supporting frame embedded in the fifth sleeve, wherein the second supporting frame has a fifth guiding head protrudingly formed on an outer surface of the second supporting frame, wherein when the second supporting frame is embedded in the fifth sleeve, the fourth guiding head is movably provided in the third guiding groove of the first supporting frame, wherein when the fifth sleeve is driven by the first support frame to move up or down helically, the second support frame is driven by the fifth sleeve to move up or down vertically.

13. The retractable camera module according to claim 12, wherein the second supporting frame has a guiding portion protrudingly formed on an outer surface of the second supporting frame and extended vertically.

14. The retractable camera module according to claim 13, wherein the third movable member comprises a sixth sleeve embedded between the second supporting frame and the fifth sleeve, wherein the sixth sleeve has a sixth guiding head protrudingly formed on an outer surface of the sixth sleeve and a guiding slot concavely formed on an inner surface of the sixth sleeve and extended vertically, wherein when the sixth sleeve is embedded between the second supporting frame and the fifth sleeve, the sixth guiding head is engaged in the third helix guiding rail of the fifth sleeve and the guiding portion is engaged in the guiding slot, wherein when the fifth sleeve is driven by the first supporting frame to move up or down helically, the sixth sleeve is driven to move up or down vertically along the third helical guiding rail.

15. The retractable camera module according to claim 4, wherein the casing is made of metal material, and the first sleeve is made of plastic material.

16. The retractable camera module according to claim 6, wherein the second sleeve has an annular rack formed on the outer surface thereof, and a force provided by the first driving element is applied on the annular rack to drive the second sleeve to rotate.

17. The retractable camera module according to claim 16, wherein the first sleeve further has a receiving groove, and the retractable assembly further comprises a gear column disposed in the receiving groove, and the gear column is engaged with the annular rack of the second sleeve, wherein the force provided by the first drive element is applied on the gear column to transmit the force to the second sleeve through the gear column as a transmission element.

18. The retractable camera module according to claim 6, wherein the first driving element is an annular ultrasonic motor.

19. The retractable camera module according to claim 2, wherein the retractable camera module further comprises a guiding sleeve extended retractably between the photosensitive assembly and the upper end of the retractable sleeve assembly, wherein the guiding sleeve has a through hole corresponding to the lens and the photosensitive chip.

20. The retractable camera module according to claim 19, wherein an inner diameter of the guiding sleeve is gradually increased from top to bottom.

* * * * *